United States Patent
Gunji et al.

Patent Number: 5,952,114
Date of Patent: Sep. 14, 1999

[54] FUNCTIONAL COPPER SKIN FILM

[75] Inventors: Takahiro Gunji; Masamune Tabata; Kenji Dosaka, all of Saitama, Japan

[73] Assignee: Honda Giken Kogyo Kabushiki Kaisha, Tokyo, Japan

[21] Appl. No.: 08/622,416

[22] Filed: Mar. 27, 1996

[30] Foreign Application Priority Data

Mar. 31, 1995 [JP] Japan ................... 7-100483

[51] Int. Cl.⁶ ............... B32B 15/20; B23P 9/00
[52] U.S. Cl. ........................ 428/674; 428/687
[58] Field of Search ................... 428/612, 674, 428/687, 935; 384/912, 913

[56] References Cited

U.S. PATENT DOCUMENTS

| | | | |
|---|---|---|---|
| 4,268,302 | 5/1981 | Deffeyes et al. | 75/0.5 AA |
| 4,711,823 | 12/1987 | Shiina | 428/547 |
| 5,326,454 | 7/1994 | Engelhaupt | 205/67 |
| 5,340,660 | 8/1994 | Fujisawa et al. | 428/687 |
| 5,342,698 | 8/1994 | Fujisawa et al. | 428/612 |
| 5,376,194 | 12/1994 | Gunji et al. | 148/426 |
| 5,445,684 | 8/1995 | Gunji et al. | 148/320 |
| 5,503,942 | 4/1996 | Tabata et al. | 428/687 |
| 5,597,657 | 1/1997 | Gunji et al. | 428/680 |

FOREIGN PATENT DOCUMENTS

| | | |
|---|---|---|
| 0 300 993 A1 | 1/1989 | European Pat. Off. |
| 42 23 631 A1 | 1/1993 | Germany. |

OTHER PUBLICATIONS

English translation of Abstract of JP 6174089, Jun. 1994.
English translation of Abstract of EP 300993, Jan. 1989.
Search Report Communication.

*Primary Examiner*—Paul Thibodeau
*Assistant Examiner*—Holly C Rickman
*Attorney, Agent, or Firm*—Lyon & Lyon LLP

[57] ABSTRACT

A Cu skin film is formed of an aggregate of Cu crystals. Pyramid-shaped Cu crystals and/or conical Cu crystals exist in the surface of the Cu skin film. The area rate A of the pyramid-shaped Cu crystals, the area rate A of the conical Cu crystals or the sum A of the area rates of these Cu crystals in the skin film surface are set in a range of $A \geq 40\%$. The skin film surface takes on an intricate aspect due to the existence of the infinite number of pyramid-shaped Cu crystals and/or conical Cu crystals. If such a Cu skin film is formed, for example, on a surface opposite from that surface of a backing of a slide bearing which is opposed to a rotary shaft, the Cu skin film exhibits a good oil retention and therefore seizure due to a fretting can be avoided.

3 Claims, 21 Drawing Sheets

(hhh) plane bcc structure

Example 1

4μm

Example 1

1μm

Example 8

6μm

Example 8

1μm

Example 14

2μm

Example 14

2μm

FUNCTIONAL COPPER SKIN FILM

BACKGROUND OF THE INVENTION

1. Field of the Invention

The present invention relates to a functional copper (Cu) skin film, and particularly, to a skin film formed of an aggregate of Cu crystals.

2. Description of the Related Art

In a slide bearing for an internal combustion engine, which bearing is opposed to a rotary shaft, in order to prevent seizure and wearing due to fretting caused by a very small vibration or the like, it is conventionally known to form a Cu deposit layer, for example, on a back surface opposite from that surface of a backing made of a rolled sheet steel opposite the surface facing the rotary shaft.

However, the previously known Cu deposit layer has problems, under existing circumstances where speed and output of the internal combustion engine have tended to increase, such as the known Cu deposit layer is: not sufficient in oil retaining property, namely, oil retention due to a relatively smooth surface thereof; poor in seizure resistance because of a bad initial conformability; and low in wear resistance as a result of a local increase in surface pressure.

There is also a conventionally known graphite skin film formed by application on a surface of a work as an energy absorbing skin film in a laser machining.

However, the graphite skin film suffers from a problem that spots are liable to be produced, because the graphite skin film is formed by the application and as a result, it is difficult for the graphite skin film to exhibit a uniform energy absorbing ability over the whole thereof.

SUMMARY OF THE INVENTION

It is an object of the present invention to provide a functional Cu skin film of the above-described type, which has an excellent seizure resistance and an excellent wear resistance and which is capable of efficiently absorbing an energy such as light and heat.

To achieve the above object, according to the present invention, there is provided a Cu skin film formed of an aggregate of Cu crystals, wherein the area rate A of pyramid-shaped Cu crystals or conical Cu crystals in a skin film surface is in a range of $A \geq 40\%$, or the sum A of the area rate of the pyramid-shaped Cu crystals and the area rate of the conical Cu crystals is in a range of $A \geq 40\%$. The Cu skin film of this type can be formed by a plating.

If the area rate A of the pyramid-shaped Cu crystals or the like is set in such range, for example, in a skin film provided on a back surface of a backing of a slide bearing for an internal combustion engine, fine valleys extending at random are formed on the skin film surface by a large number of pyramid-shaped Cu crystals or the like and hence, the skin film surface takes on an intricate aspect.

Such Cu skin film exhibits a good oil retention under lubrication and on the other hand, exhibits a pressing load dispersing effect by the large number of fine pyramid-shaped Cu crystals or the like under non-lubrication. In addition, the initial conformability is improved by a preferential wearing of tip ends of the pyramid-shaped Cu crystals. Thus, the Cu skin film has an excellent seizure resistance both under lubrication and under non-lubrication.

Further, as a result of the uniform fine division of the pyramid-shaped Cu crystals or the like, a local increase in surface pressure can be avoided, and a fine division of a pressing load can be achieved. Thus, the Cu skin film exhibits an excellent wear resistance not only under lubrication but also under non-lubrication.

With such Cu skin film, a seizure due to fretting can be avoided, and wearing can be inhibited.

If the area rate A of the pyramid-shaped Cu crystals or the like is set in the above-described range in the energy absorbing skin film, it is possible to uniformly disperse the pyramid-shaped Cu crystals or the like over the entire skin film surface to form a large number of valleys by the adjacent pyramid-shaped Cu crystals or the like.

In such skin film surface, for example, some of the light rays or beams (including visible rays, infrared rays, laser beams and the like) applied to the skin film layer to impinge on slopes of the large number of fine pyramid-shaped Cu crystals are absorbed, and other beams are reflected. The reflected beams impinge on the slopes of the adjacent pyramid-shaped Cu crystals or the like, and such entering and reflection are repeated. Thus, the probability of emergence of light beams from the valleys between the adjacent pyramid-shaped Cu crystals or the like is remarkably reduced and therefore, the skin film surface exhibits a uniform energy absorbing ability over the whole thereof.

However, if the area rate A is lower than 40%, the content (which indicates the existing amount) of the pyramid-shaped Cu crystals or the like is decreased, and the skin film surface tends to be simplified. Therefore, the function and effect as described above cannot be provided in the energy absorbing skin film on the slide bearing.

The above and other objects, features and advantages of the invention will become apparent from the following detailed description of preferred embodiments taken in conjunction with the accompanying drawings.

DETAILED DESCIPTION OF THE PREFERRED EMBODIMENTS (First Embodiment)

A first embodiment of the p resent invention will be described by way of a Cu skin film which is formed of a back surface of a backing of a slide bearing for an internal combustion engine.

Figure 1:
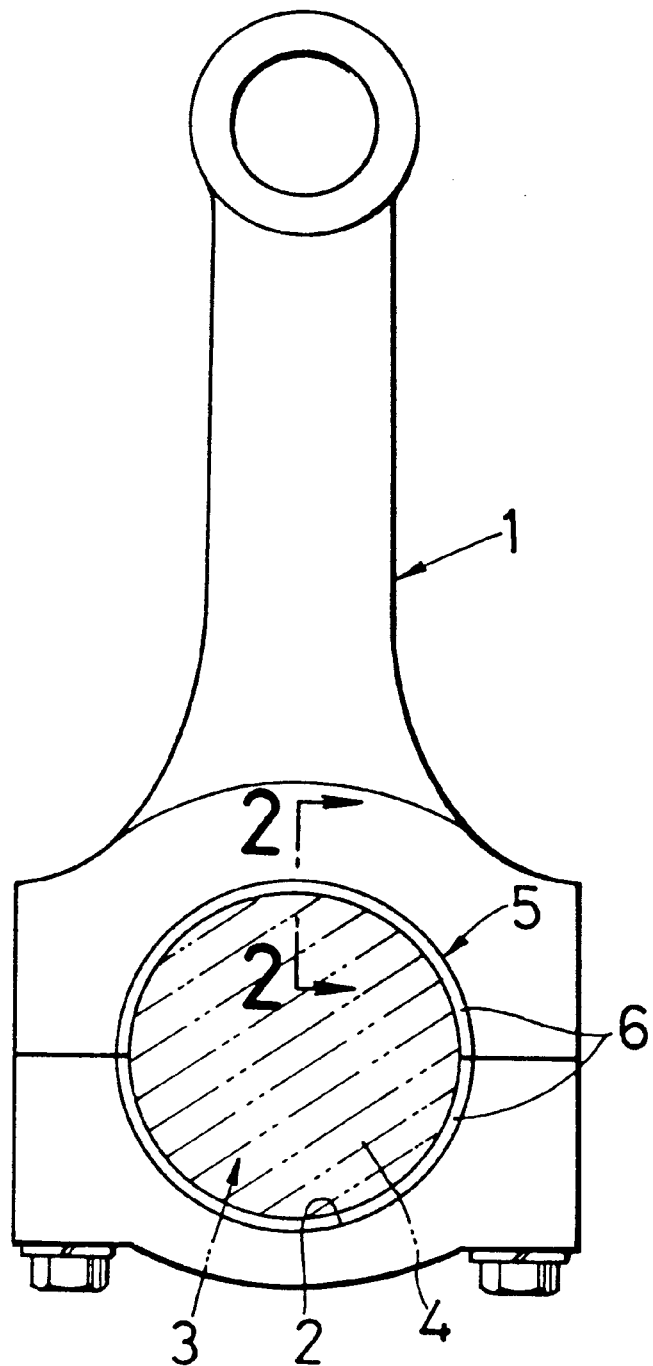
FIG. 1 is a front view of a connecting rod including a slide bearing.

Referring to FIG. 1, a slide bearing 5 is disposed between a hole 2 in a larger end of a connecting rod 1 for an internal combustion engine and a crank pin 4 of a crankshaft 3. The slide bearing 5 is comprised of a pair of semi-annular halves 6 which have the same structure.

Figure 2:
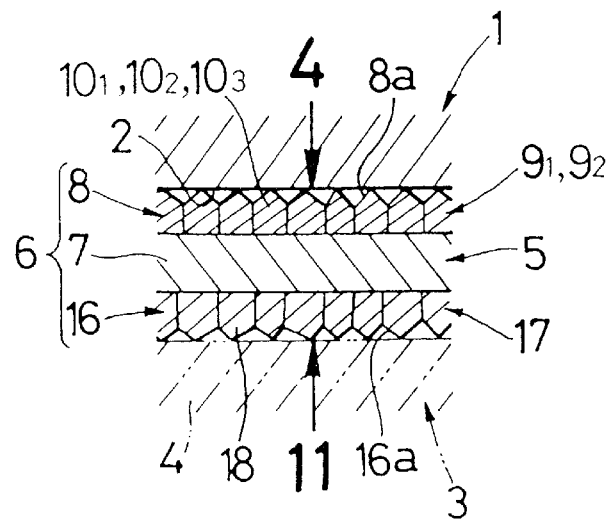
FIG. 2 is an enlarged sectional view taken along a line 2—2 in FIG.1.

As shown in FIG. 2, in the backing 7 of each semi-annular half 6, a Cu skin film 8 is formed by plating on that outer peripheral surface of the backing 7 of each semi-annular half 6, which is opposed to the hole 2.

Figure 3:
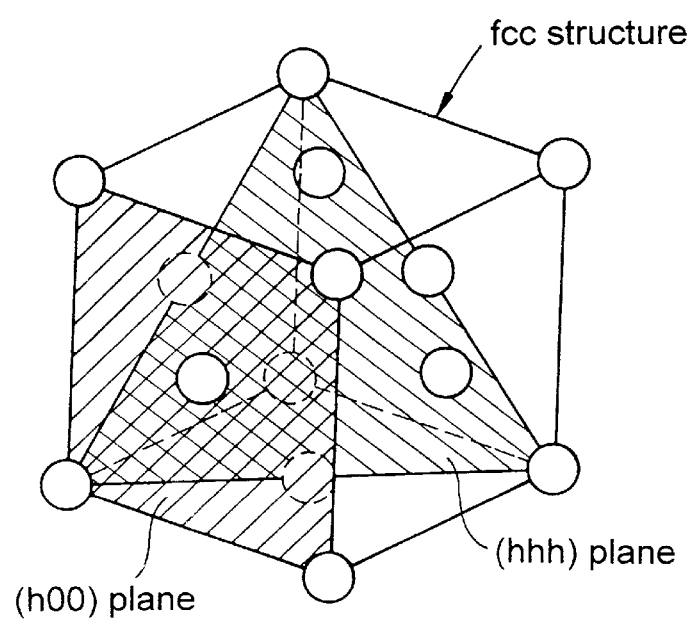
FIG. 3 is a perspective view showing a face-centered cubic structure and its (h00) and (hhh) planes.

The Cu skin film 8 is formed of an aggregate of Cu crystals having a face-centered cubic structure (which also will be referred to as an fcc structure hereinafter), as shown in FIG. 3. The aggregate includes a large number of (h00) oriented Cu crystals $9_1$ which are grown into a columnar shaped from the outer peripheral surface of the backing 7 with their (h00) planes (by Miller indices) oriented toward a surface $8a$ of the skin film, as shown in FIG. 2.

Figure 4:
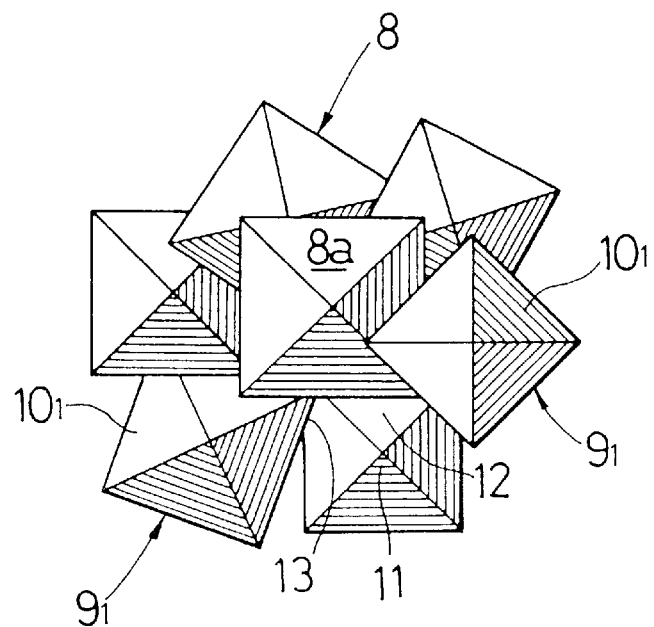
FIG. 4 is an enlarged view taken in a direction of an arrow 4 in FIG. 2 and showing one example of a Cu skin film.

When the aggregate of the Cu crystals having the fcc structure as described above includes a large number of (h00) oriented Cu crystals $9_1$ with their (h00) planes (by Miller indices) oriented toward the skin film surface $8a$, tip ends of the (h00) oriented Cu crystals $9_1$ can be formed into tetragonal pyramid-shaped Cu crystals (pyramid-shaped Cu crystals $10_1$ in the skin film surface $8a$, as shown in FIG. 4).

In this case, the area rate A of the tetragonal pyramid-shaped Cu crystals $10_1$ in the skin film surface $8a$ is set in a range of $A \geq 40\%$ (including $A=100\%$).

If the area rate A is set in such range, adjacent ones of the tetragonal pyramid-shaped Cu crystals $10_1$ assume mutually biting states, as shown in FIG. 4. Thus, the skin film surface $8a$ takes on a very intricate aspect comprising a large number of fine crests 11, a large number of fine valleys 12 formed between the crests 11 and extending at random, and a large number of fine swamps 13 formed due to the mutual biting of the crests 11.

Such Cu skin film 8 exhibits a good oil retention under lubrication, and exhibits a pressing load dispersing effect by the large number of tetragonal pyramid-shaped Cu crystals $10_1$ under non-lubrication. A good initial conformability is provided by a preferential wearing of the tip ends of the tetragonal pyramid-shaped Cu crystals $10_1$. Thus, the Cu skin film 8 has an excellent seizure resistance both under lubrication and under non-lubrication.

As a result of a uniform fine division of the tetragonal pyramid-shaped Cu crystals $10_1$, a local increase in surface pressure can be avoided and a fine division of a pressing load can be achieved. Thus, the Cu skin film 8 exhibits an excellent wear resistance not only under lubrication but also under non-lubrication.

With such Cu skin film 8, a seizure due to fretting can be avoided and wearing can be inhibited.

Figure 5:
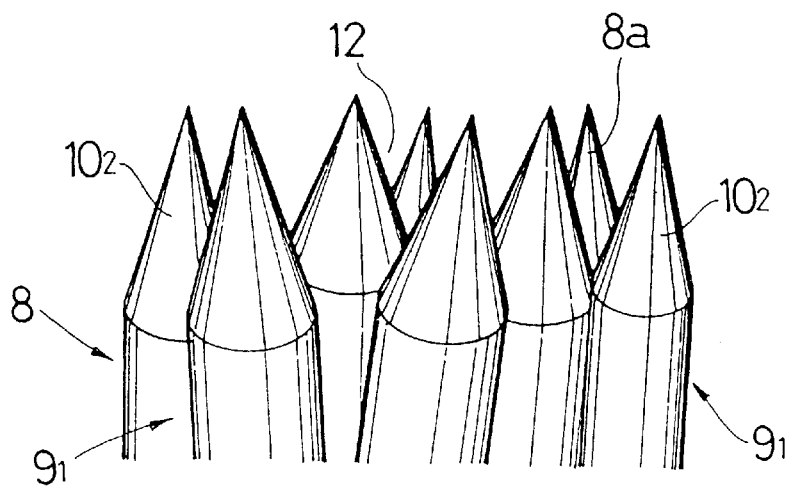
FIG. 5 is a perspective view of an essential portion of another example of the Cu skin film.

On the other hand, when the aggregate of the Cu crystals having the fcc structure as described above includes a large number of (h00) oriented Cu crystals $9_1$ with their (h00) planes (by Miller indices) oriented toward the skin film surface $8a$, tip ends of the (h00) oriented Cu crystals $9_1$ can be formed into conical Cu crystals $10_2$ in the skin film surface $8a$, as shown in FIG. 5.

In this case, the area rate A of the conical Cu crystals $10_2$ in the skin film surface $8a$ is set in a range of $A \geq 40\%$ (including $A=100\%$)

If the area rate A is set in such range, fine valleys 12 extending at random are formed by the large number of conical Cu crystals $10_2$ and hence, the skin film surface $8a$ takes on an intricate aspect.

Such Cu skin film 8 likewise exhibits a good oil retention under lubrication, and exhibits a pressing load dispersing effect by the larger number of conical Cu crystals $10_2$ under non-lubrication. A good initial conformability is provided by a preferential wearing of the tip ends of the conical Cu crystals. Thus, the Cu skin film 8 has an excellent seizure resistance both under lubrication and under non-lubrication.

Further, as a result of a uniform fine division of the conical Cu crystals 10₂, a local increase in surface pressure can be avoided, and a fine division of the pressing load can be achieved. Thus, the Cu skin film 8 exhibits an excellent wear resistance not only under lubrication but also under non-lubrication.

With such Cu skin film 8, a seizure due to fretting can be avoided and wearing can be inhibited.

When the Cu skin film 8 is formed of the aggregate of the Cu crystals having the face-centered cubic structure (fcc structure) as shown in FIG. 3, the aggregate may include a large number of (hhh) oriented Cu crystals 9₂ which are grown into a columnar shape from the outer peripheral surface of the backing 7 with their (hhh) planes (by Miller indices) oriented toward the skin film surface 8a.

Figure 6:
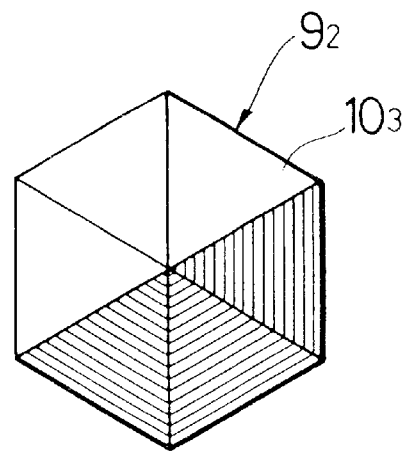
FIG. 6 is a plan view of a hexagonal pyramid-shaped Cu crystal forming the Cu skin film.

When the aggregate of the Cu crystals having the fcc structure as described above includes the large number of (hhh) oriented Cu crystals 9₂ with their (hhh) planes (by Miller indices) oriented toward the skin film surface 8a, tip ends of the (hhh) oriented Cu crystals 9₂ can be formed into hexagonal pyramid-shaped Cu crystals (pyramid-shaped Cu crystals) 10₃ in the skin film surface 8a, as shown in FIG. 6.

In this case, the area rate A of the hexagonal pyramid-shaped Cu crystals 10₃ in the skin film surface 8a is set in a range of $A \geq 40\%$ (including $A=100\%$).

The Cu skin film 8 having the area rate A set in such range has a seizure resistance equivalent to or higher than that of the skin film 8 including the tetragonal pyramid-shaped Cu crystals 10₁ both under lubrication and under non-lubrication, and has a wear resistance equivalent to that of the skin film 8 including the tetragonal pyramid-shaped Cu crystals 10₁. When the tetragonal and hexagonal pyramid-shaped Cu crystals 10₁ and 10₃ exist in the skin film surface 8a, the aspect of the skin film surface 8a is more complicated than that of the skin film surface 8a having the conical Cu crystals 10₂ existing therein.

From the above facts, it can be said that if the flowability of a lubricating agent and the oil retention are taken into consideration, the Cu skin film 8 including the tetragonal and hexagonal pyramid-shaped Cu crystals 10₁ and 10₃ is suitable for a system where a lubricating agent having a relatively low viscosity is used, and the Cu skin film 8 including the conical Cu crystals 10₂ is suitable for a system where a lubricating agent having a relatively high viscosity is used.

The Cu skin film 8 includes those in which a combination of the tetragonal pyramid-shaped and conical Cu crystals 10₁ and 10₂, a combination of the tetragonal and hexagonal pyramid-shaped Cu crystals 10₁ and 10₃, a combination of the conical and hexagonal pyramid-shaped Cu crystals 10₂ and 10₃, as well as a combination of the tetragonal pyramid-shaped, conical and hexagonal pyramid-shaped Cu crystals 10₁, 10₂ and 10₃ exist in the skin film surface 8a. For example, when the combination of the tetragonal pyramid-shaped and conical Cu crystals 10₁ and 10₂ exists in the Cu skin film surface 8a, the area rate of such combination existing in the Cu skin film surface 8a amounts to a sum of the area rates of the tetragonal pyramid-shaped and conical Cu crystals 10₁ and 10₂, and the same is true of the other combinations. Even in this case, the area rate A includes $A=100\%$.

Figure 7:
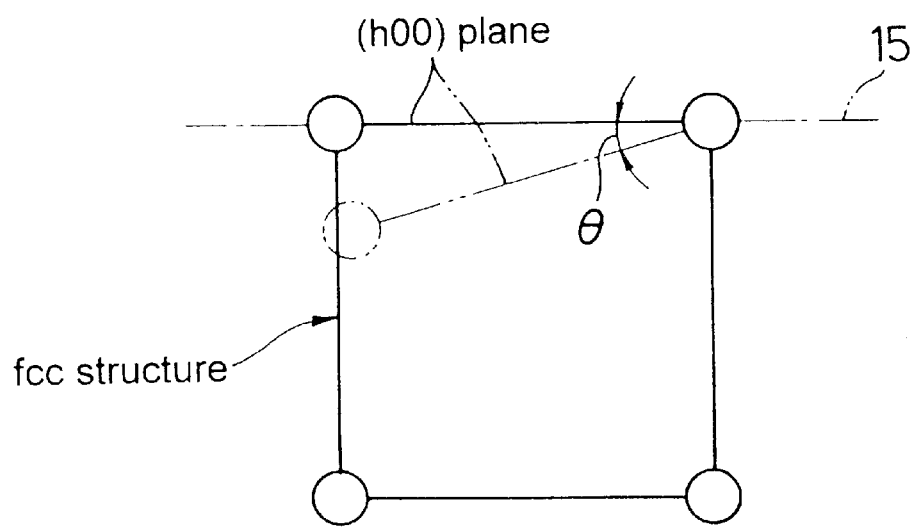
FIG. 7 is a diagram showing the inclination of the (h00) plane in the face-centered cubic structure.
Figure 8:
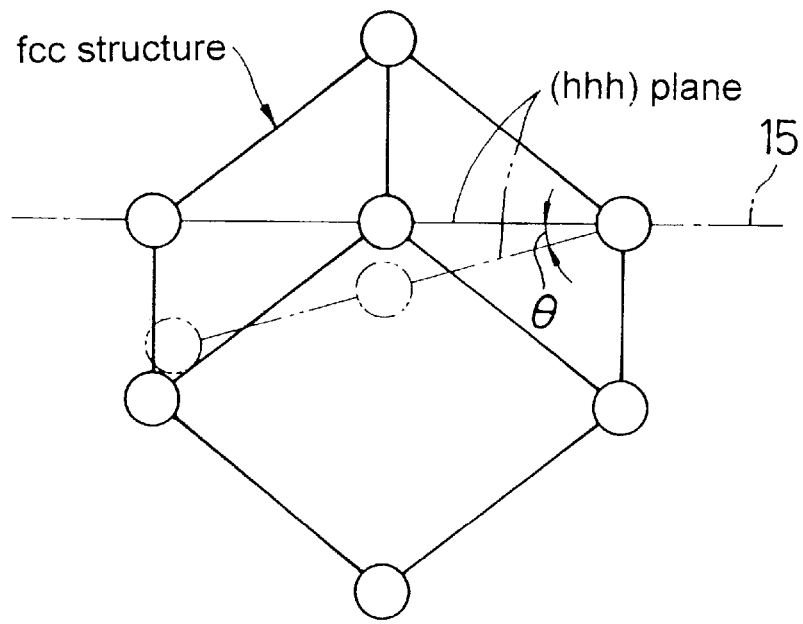
FIG. 8 is a diagram showing the inclination of the (hhh) plane in the face-centered cubic structure.
Figure 9:
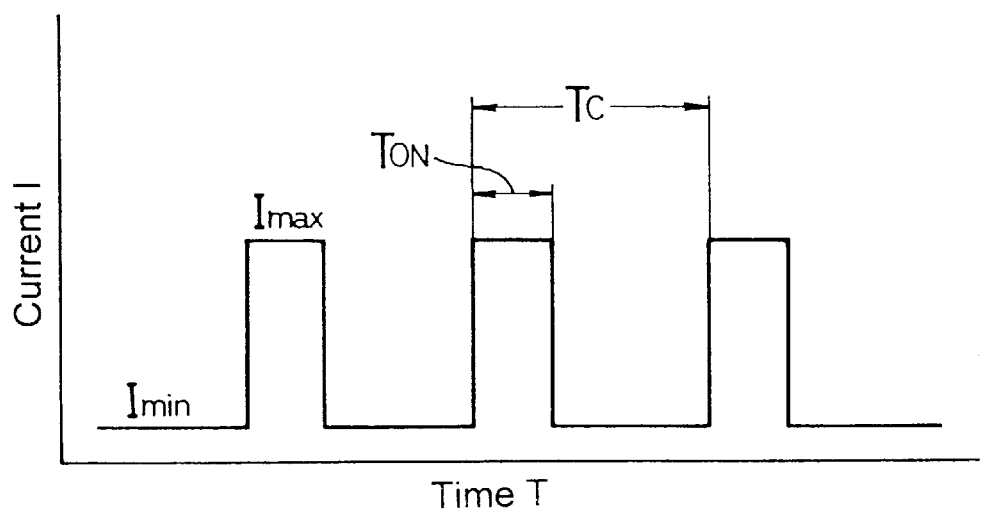
FIG. 9 is a wave form of an output from a power source for an electrolytic Cu plating.

The inclination of the (h00) plane and the (hhh) plane with respect to a phantom plane 15 along the skin film surface 8a appears as the inclination of the tetragonal pyramid-shaped and conical Cu crystals 10₁ and 10₂ as well as the hexagonal pyramid-shaped Cu crystals 10₃, as shown in FIGS. 7 and 8 and hence, an influence is imparted to the oil retention and wear resistance of the Cu skin film 8. The inclination angle θ formed by the (h00) plane and the (hhh) plane preferably is set in a range of $0° \leq \theta \approx 15°$. In this case, the direction of inclination of the (h00) and (hhh) planes is not limited. If the inclination angle θ is larger than 15°, the oil retention and wear resistance of the Cu skin film 8 are lowered.

In a plating treatment for forming the Cu skin film 8, conditions for a plating bath in carrying out an electrolytic Cu plating process are as given in Table 1.

TABLE 1

| Composition (g/liter) | | | | |
|---|---|---|---|---|
| Cuprous cyanide | Sodium cyanide | Sodium carbonate | pH | Temperature (° C.) |
| 10–100 | 0–150 | 0–100 | 7.2–14 | 30–100 |

The adjustment of pH of the plating bath was carried out using potassium hydroxide.

A pulse current process is mainly utilized as an energizing process. In the pulse current process, electric current I from a plating power source is controlled to describe a pulse wave form with the passage of time T, so that the electric current I is increased from a minimum current value Imin and reaches a maximum current value Imax, and is then dropped to the minimum current value Imin.

If the energization time period from the start of the increasing of the electric current I to the start of the dropping is represented by $T_{ON}$, and the cycle time period is represented by $T_C$, wherein one cycle is defined as being from the proceeding increasing to the succeeding increasing, the energization time period $T_{ON}$ is set in a range of $1 \text{ msec} \leq T_{ON} \leq 20 \text{ sec}$, and the ratio $T_{ON}/T_C$ of the energization time period $T_{ON}$ to the cycle time period $T_C$ is set in a range of $T_{ON}/T_C \leq 0.8$. The maximum cathode current density CDmax is set in a range of $CDmax \geq 1 \text{ A/dm}^2$, and the average cathode current density CDm is set in a range of $1 \text{ A/dm}^2 \leq CDm \leq 15 \text{ A/dm}^2$.

If such pulse current process is utilized, the ion concentration in the vicinity of a cathode is uniformized due to the fact that the maximum electric current alternately flows and does not flow within the plating bath. Thus, the composition of the Cu skin film 8 can be stabilized.

In the electrolytic Cu plating process, the precipitation, content and the like of the tetragonal pyramid-shaped Cu crystals 10₁, the conical Cu crystals 10₂ and the hexagonal pyramid-shaped Cu crystals 10₃ are controlled by changing the plating conditions and the energizing conditions. This control is easy under utilization of the pulse current process and hence, the skin film surface 8a is easily formed into an intended form.

Table 2 shows the rough comparison of the conditions for forming the conical and hexagonal pyramid-shaped Cu crystals $10_2$ and $10_3$ with the conditions for forming the tetragonal pyramid-shaped Cu crystals $10_1$.

TABLE 2

| Cu crystals | pH | Sodium carbonate | CDm | $T_{ON}/T_C$ | $T_{ON}$ |
|---|---|---|---|---|---|
| Tetragonal pyramid-shaped | a | b | c | d | e |
| Conical | a | b | c | d | <<e |
| Hexagonal pyramid-shaped | a | <<b (including 0) | <c | <d | <<e |

In addition to the electrolytic Cu plating process, examples of other plating processes are a PVD process, a CVD process, a sputtering process, and an ion plating, which are gas-phase plating processes. Conditions for carrying the Cu plating by a sputtering process are as follows: For example, the Ar gas pressure is 0.2 to 1.0 Pa; the average Ar gas accelerating electric power is D.C. 0.1 to 1.0 kW; and the substrate temperature is 80 to 300° C.

As shown in FIG. 2, a lamellar slide surface construction 16 is formed by an electrolytic plating process on that inner peripheral surface of the backing 7 of each semi-annular half 6, which slide surface is opposed to the crank pin 4.

Figure 10:
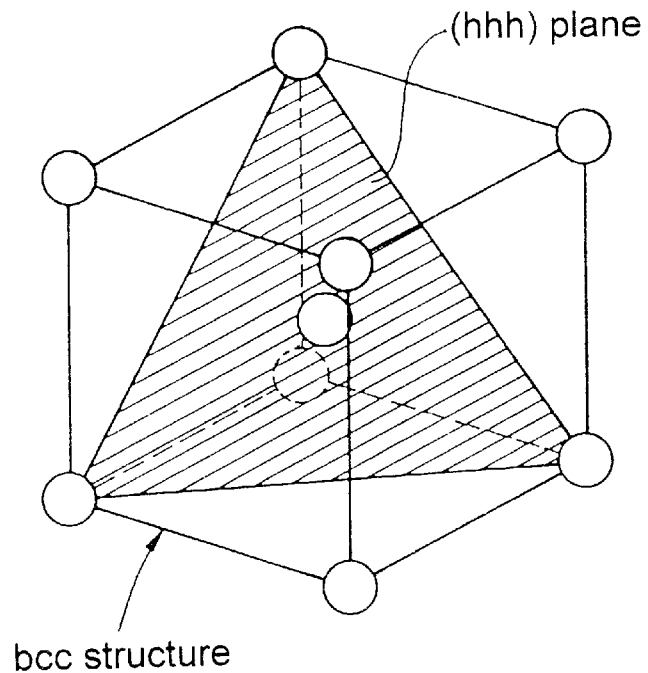
FIG. 10 is a perspective view showing a body-centered cubic structure and its (hhh) plane.
Figure 11:
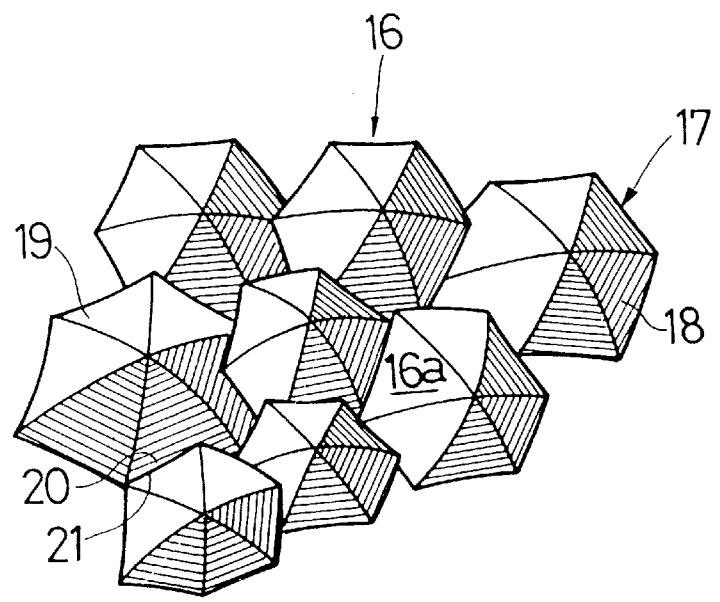
FIG. 11 is an enlarged view taken in a direction of an arrow 11 in FIG. 2.

The slide surface construction 16 is formed of an aggregate of metal crystals, e.g., Fe crystals, having a body-centered cubic structure (which will be also referred to as a bcc structure hereinafter), as shown in FIG. 10. The aggregate includes a large number of (hhh) oriented Fe crystals which are grown into a columnar shape from the inner peripheral surface of the backing 7 with their (hhh) planes (by Miller indices) oriented toward a slide surface 16a. Tip ends of the (hhh) oriented Fe crystals are formed into hexagonal pyramid-shaped Fe crystals 18 in the slide surface 16a, as shown in FIG. 11.

The adjacent hexagonal pyramid-shaped Fe crystals 18 assume mutually biting states in the slide surface 16a and thus, the slide surface 16a takes on a very intricate aspect comprising a large number of extremely fine crests 19, a large number of extremely fine valleys 20 formed between the crests 19 and extending at random, and a large number of extremely fine swamps 21 formed due to the mutual biting of the crests 19.

Such slide surface construction 16 exhibits a good oil retention under lubrication, and exhibits a sliding load dispersing effect by the large number of extremely fine hexagonal pyramid-shaped Fe crystals 18 under non-lubrication. Thus, the slide surface construction 16 has an excellent seizure resistance both under lubrication and under non-lubrication.

Further, as a result of a uniform fine division of the hexagonal pyramid-shaped Fe crystals 18, a local increase in surface pressure can be avoided, and a fine division of a sliding load can be achieved. Thus, the slide surface construction 16 exhibits an excellent wear resistance not only under lubrication but also under non-lubrication.

Particular examples will be described below.

A Cu skin film 8 formed of an aggregate of Cu crystals and having a thickness of 15 μm was formed on an outer peripheral surface of a backing 7 made of a rolled steel sheet (JIS SS400) by subjecting the outer peripheral surface to an electrolytic Cu plating process.

Tables 3, 4, 5 and 6 show conditions for the electrolytic Cu plating process for examples 1 to 21, with Table 3 corresponding to the examples 1 to 7; Table 4 corresponding to the examples 8 to 13; Table 5 corresponding to the examples 14 to 17; and Table 6 corresponding to the examples 18 to 21.

TABLE 3

| | Plating bath | | | | | Pulse current process | | | | |
|---|---|---|---|---|---|---|---|---|---|---|
| | Composition (g/liter) | | | | | | | | | |
| Cu skin film | Cuprous cyanide | Sodium cyanide | Sodium carbonate | pH | Temperature (° C.) | CDmax (A/dm$^2$) | CDm (A/dm$^2$) | $T_{ON}/T_C$ | $T_{ON}$ (sec) | Plating time (min) |
| Example 1 | 90 | 100 | 30 | 10 | 80 | 13.3 | 10 | 0.75 | 12 | 6 |
| Example 2 | 80 | 90 | 30 | 10 | 80 | 12 | 9 | 0.75 | 12 | 7 |
| Example 3 | 80 | 90 | 30 | 10 | 80 | 10.7 | 8 | 0.75 | 12 | 8 |
| Example 4 | 70 | 90 | 30 | 11 | 80 | 8 | 6 | 0.75 | 12 | 9 |
| Example 5 | 70 | 90 | 30 | 12 | 80 | 6.7 | 5 | 0.75 | 12 | 10 |
| Example 6 | 80 | 90 | 30 | 10 | 80 | 20 | 10 | 0.5 | 1 | 6 |
| Example 7 | 60 | 90 | 30 | 12.5 | 80 | 8 | 4 | 0.5 | 12 | 15 |

TABLE 4

| Cu skin film | Plating bath | | | | | Pulse current process | | | | |
| --- | --- | --- | --- | --- | --- | --- | --- | --- | --- | --- |
| | Composition (g/liter) | | | | | | | | | |
| | Cuprous cyanide | Sodium cyanide | Sodium carbonate | pH | Temperature (°C.) | CDmax (A/dm$^2$) | CDm (A/dm$^2$) | $T_{ON}/T_C$ | $T_{ON}$ (sec) | Plating time (min) |
| Example 8 | 90 | 100 | 30 | 10 | 80 | 50 | 10 | 0.2 | 2 | 6 |
| Example 9 | 80 | 90 | 30 | 10 | 80 | 45 | 9 | 0.2 | 2 | 7 |
| Example 10 | 80 | 90 | 30 | 10 | 80 | 40 | 8 | 0.2 | 2 | 8 |
| Example 11 | 70 | 90 | 30 | 11 | 80 | 30 | 6 | 0.2 | 2 | 9 |
| Example 12 | 70 | 90 | 30 | 12 | 80 | 25 | 5 | 0.2 | 2 | 10 |
| Example 13 | 80 | 90 | 30 | 10 | 80 | 20 | 10 | 0.5 | 10 | 6 |

TABLE 5

| Cu skin film | Plating bath | | | | | Pulse current process | | | | |
| --- | --- | --- | --- | --- | --- | --- | --- | --- | --- | --- |
| | Composition (g/liter) | | | | | | | | | |
| | Cuprous cyanide | Sodium cyanide | Sodium carbonate | pH | Temperature (°C.) | CDmax (A/dm$^2$) | CDm (A/dm$^2$) | $T_{ON}/T_C$ | $T_{ON}$ (sec) | Plating time (min) |
| Example 14 | 90 | 90 | 0 | 10 | 80 | 10 | 2 | 0.2 | 2 | 40 |
| Example 15 | 90 | 90 | 0 | 10 | 80 | 12.5 | 2.5 | 0.2 | 2 | 30 |
| Example 16 | 80 | 80 | 0 | 10 | 80 | 20 | 4 | 0.2 | 2 | 15 |
| Example 17 | 80 | 80 | 0 | 12 | 80 | 25 | 5 | 0.2 | 2 | 10 |

TABLE 6

| Cu skin film | Plating bath | | | | | Pulse current process | | | | |
| --- | --- | --- | --- | --- | --- | --- | --- | --- | --- | --- |
| | Composition (g/liter) | | | | | | | | | |
| | Cuprous cyanide | Sodium cyanide | Sodium carbonate | pH | Temperature (°C.) | CDmax (A/dm$^2$) | CDm (A/dm$^2$) | $T_{ON}/T_C$ | $T_{ON}$ (sec) | Plating time (min) |
| Example 18 | 90 | 90 | 10 | 10 | 80 | 10 | 2 | 0.2 | 10 | 40 |
| Example 19 | 80 | 90 | 20 | 10 | 80 | 45 | 9 | 0.2 | 2 | 7 |
| Example 20 | 90 | 90 | 10 | 10 | 80 | 20 | 2 | 0.1 | 2 | 40 |
| Example 21 | 90 | 90 | 10 | 10 | 80 | 20 | 2 | 0.1 | 10 | 40 |

Tables 7, 8, 9 and 10 show the crystal form of the skin film surface, the area rate A and grain size of the tetragonal pyramid-shaped, conical and hexagonal pyramid-shaped Cu crystals in the skin film surface, the content S of the oriented Cu crystals, and the hardness of a section of the Cu skin film for the examples 1 to 21, with Table 7 corresponding to the examples 1 to 7; Table 8 corresponding to the examples 8 to 13; Table 9 corresponding to the examples 14 to 17; and Table 10 corresponding to the examples 18 to 21.

TABLE 7

| Cu skin film | Crystal form of skin film surface | Tetragonal pyramid-shaped and conical Cu crystals Area rate A (%) | Grain size (μm) | Content S (%) of oriented Cu crystals {111} | {200} | {220} | {311} | Hardness HmV |
|---|---|---|---|---|---|---|---|---|
| Example 1 | Tetragonal pyramid-shaped | 100 | 0.5–2 | 1 | 98.1 | 0.5 | 0.4 | 180 |
| Example 2 | Tetragonal pyramid-shaped Granular | 80 — | 0.5–2 | 11.4 | 82.6 | 3 | 3 | 170 |
| Example 3 | Tetragonal pyramid-shaped Granular | 75 — | 0.5–2 | 18.4 | 75.2 | 3.1 | 3.3 | 170 |
| Example 4 | Tetragonal pyramid-shaped Granular | 40 — | 0.5–2 | 26.5 | 43.8 | 15.4 | 14.3 | 160 |
| Example 5 | Tetragonal pyramid-shaped Granular | 35 — | 0.5–2 | 25.9 | 36 | 20.6 | 17.5 | 160 |
| Example 6 | Tetragonal pyramid-shaped Conical | 80 20 | 0.5–2 | 1.1 | 95.5 | 1.7 | 1.7 | 180 |
| Example 7 | Granular | 0 | (≦1) | 21.4 | 23.8 | 26.9 | 27.9 | 130 |

TABLE 8

| Cu skin film | Crystal form of skin film surface | Conical and Tetragonal pyramid-shaped Cu crystals Area rate A (%) | Grain size (μm) | Content S (%) of oriented Cu crystals {111} | {200} | {220} | {311} | Hardness HmV |
|---|---|---|---|---|---|---|---|---|
| Example 8 | Conical | 100 | 0.5–1.5 | 0.5 | 96.2 | 2.2 | 1.1 | 190 |
| Example 9 | Conical Granular | 80 — | 0.5–1.5 | 5.7 | 80.2 | 7.6 | 6.5 | 180 |
| Example 10 | Conical Granular | 75 — | 0.5–1.5 | 6.1 | 75.8 | 8.7 | 9.4 | 170 |
| Example 11 | Conical Granular | 40 — | 0.5–1.5 | 15.9 | 44.4 | 19.2 | 20.5 | 160 |
| Example 12 | Conical Granular | 35 — | 0.5–1.5 | 16.6 | 35.5 | 22 | 25.9 | 150 |
| Example 13 | Conical Tetragonal pyramid-shaped | 80 20 | 0.5–2 | 0.2 | 95.9 | 1.9 | 2 | 180 |

TABLE 9

| Cu skin film | Crystal form of skin film surface | Hexagonal pyramid-shaped Cu crystals Area rate A (%) | Grain size (μm) | Content S (%) of oriented Cu crystals {111} | {200} | {220} | {311} | Hardness HmV |
|---|---|---|---|---|---|---|---|---|
| Example 14 | Hexagonal pyramid-shaped Granular | 80 — | 0.5–2 | 81.1 | 7.4 | 7.1 | 4.4 | 170 |
| Example 15 | Hexagonal pyramid-shaped Granular | 75 — | 0.5–2 | 75.3 | 6.8 | 10.1 | 7.8 | 170 |
| Example 16 | Hexagonal pyramid-shaped Granular | 40 — | 0.5–2 | 42.4 | 17.3 | 20.6 | 19.7 | 160 |

TABLE 9-continued

| Cu skin film | Crystal form of skin film surface | Hexagonal pyramid-shaped Cu crystals | | Content S (%) of oriented Cu crystals | | | | Hardness |
| | | Area rate A (%) | Grain size (μm) | {111} | {200} | {220} | {311} | HmV |
| --- | --- | --- | --- | --- | --- | --- | --- | --- |
| Example 17 | Hexagonal pyramid-shaped | 35 | 0.5–2 | 34.8 | 18.9 | 26.4 | 19.9 | 150 |
| | Granular | — | | | | | | |

TABLE 10

| Cu skin film | Crystal form of skin film surface | Hexagonal, tetragonal pyramid-shaped and conical Cu crystals | | Content S (%) of oriented Cu crystals | | | | Hardness |
| | | Area rate A (%) | Grain size (μm) | {111} | {200} | {220} | {311} | HmV |
| --- | --- | --- | --- | --- | --- | --- | --- | --- |
| Example 18 | Hexagonal pyramid-shaped | 80 | 0.5–2 | 80.3 | 17.6 | 1.1 | 1 | 180 |
| | Tetragonal pyramid-shaped | 20 | | | | | | |
| Example 19 | Conical | 80 | 0.5–2 | 18.2 | 80.1 | 1.2 | 0.5 | 180 |
| | Hexagonal pyramid-shaped | 20 | | | | | | |
| Example 20 | Hexagonal pyramid-shaped | 80 | 0.5–2 | 80.3 | 18.1 | 0.8 | 0.8 | 180 |
| | Conical | 20 | | | | | | |
| Example 21 | Hexagonal pyramid-shaped | 80 | 0.5–2 | 80.1 | 17.8 | 1.2 | 0.9 | 180 |
| | Tetragonal pyramid-shaped | 10 | | | | | | |
| | Conical | 10 | | | | | | |

The area rate A of the tetragonal pyramid-shaped Cu crystals and the like was determined according to an equation, $A=(c/b) \times 100$ (%), wherein b represents the area of the skin film surface, and c represents an area occupied by all the tetragonal pyramid-shaped Cu crystals and the like in the skin film surface. The grain size of the tetragonal pyramid-shaped Cu crystals is an average value of lengths of two diagonal lines. The grain size of the hexagonal pyramid-shaped Cu crystals is an average value of lengths of three diagonal lines.

Figure 12:
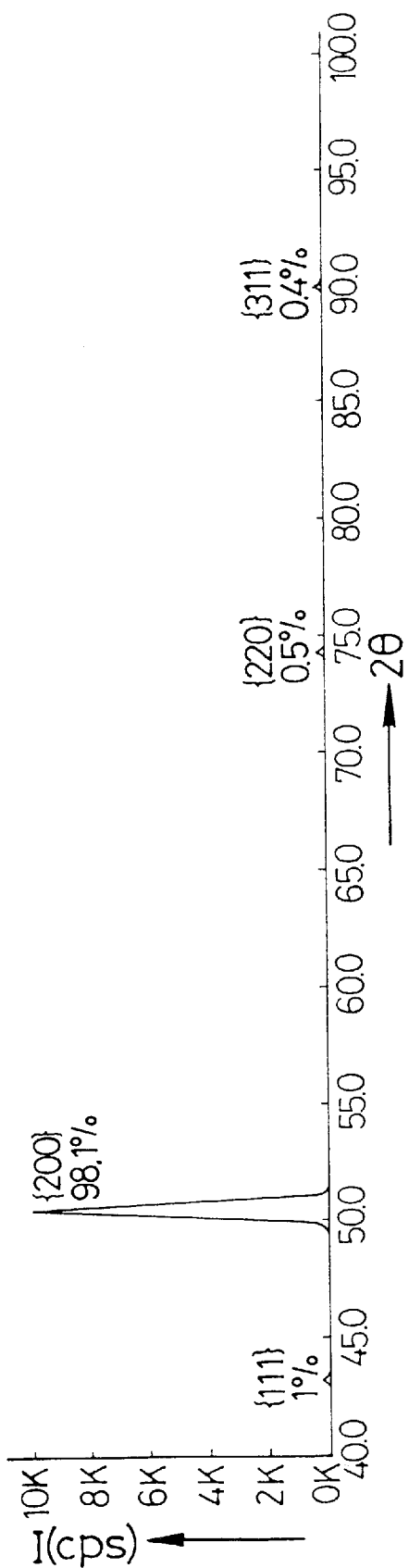
FIG. 12 is an X-ray diffraction pattern for an example 1 of a Cu skin film.
Figure 13:
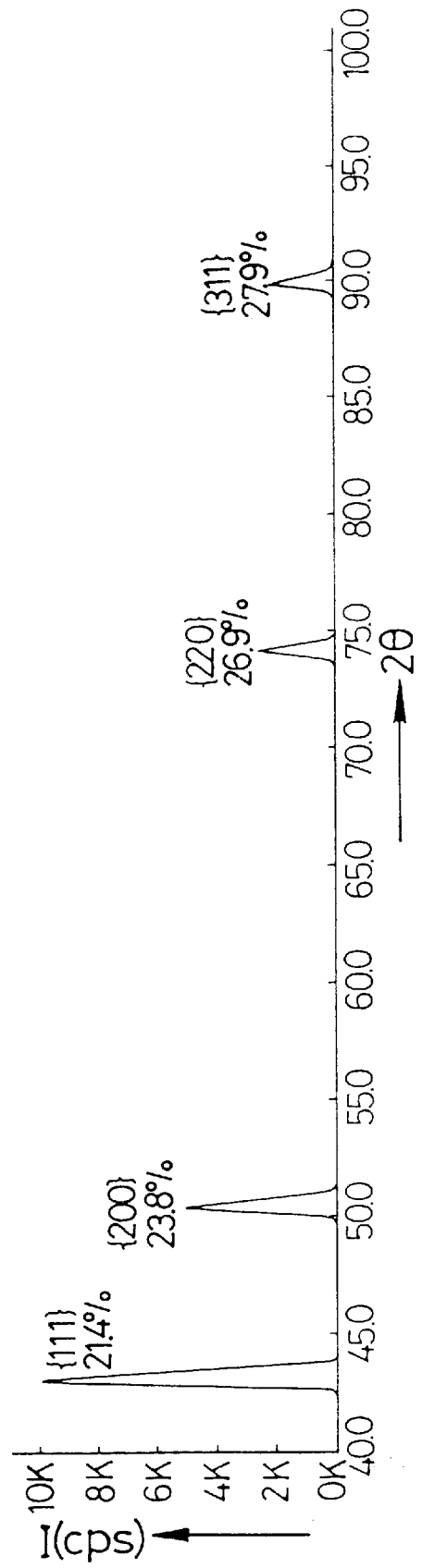
FIG. 13 is an X-ray diffraction pattern for an example 7 of the Cu skin film.
Figure 14:
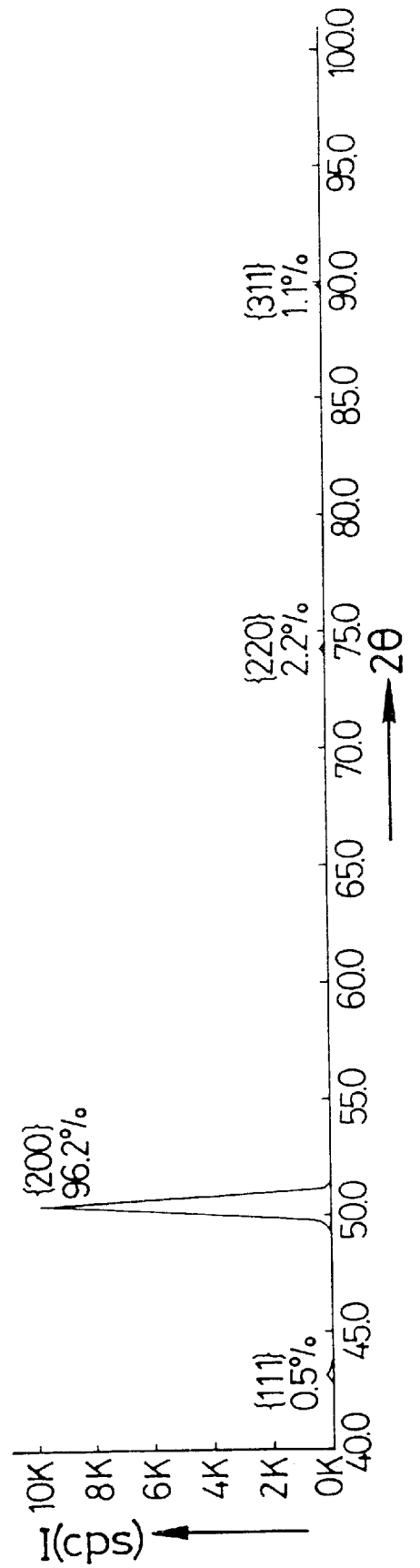
FIG. 14 is an X-ray diffraction pattern for an example 8 of the Cu skin film.
Figure 15:
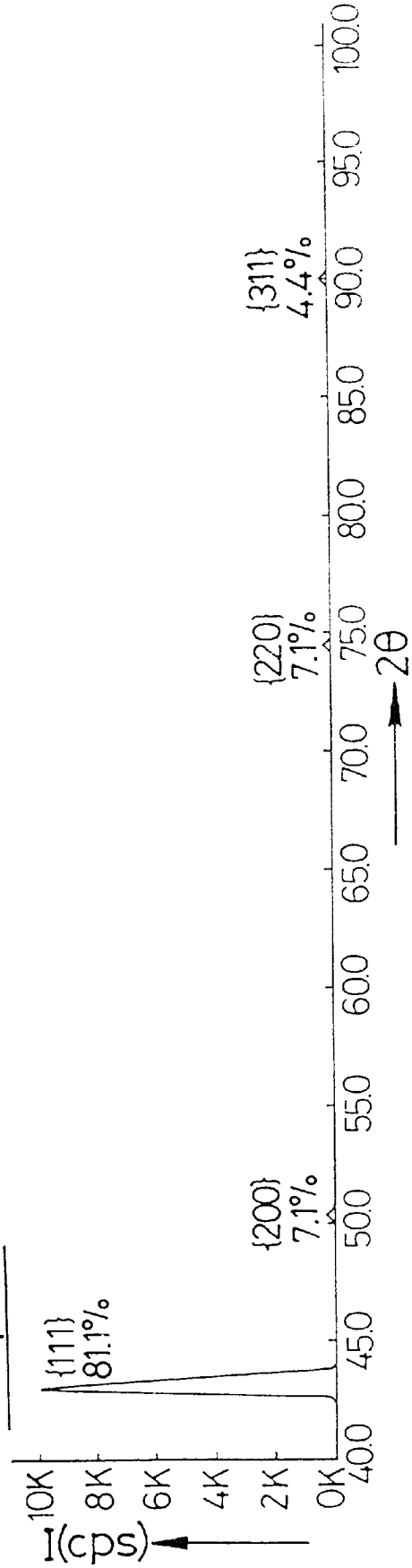
FIG. 15 is an X-ray diffraction pattern for an example 14 of the Cu skin film.

The content S of the oriented Cu crystals was determined according to the following equations, based on X-ray diffraction patterns (X-ray was applied in a direction perpendicular to the skin film surface) for the examples 1 to 21. FIG. 12 is the X-ray diffraction pattern for the example 1; FIG. 13 is the X-ray diffraction pattern for the example 7; FIG. 14 is the X-ray diffraction pattern for the example 8; and FIG. 15 is the X-ray diffraction pattern for the example 14. For example, the {111} oriented Cu crystal means an oriented crystal with its {111} plane oriented toward the skin film surface.

{111} oriented Cu crystal: $S_{111}=\{(I_{111}/IA_{111})/T\} \times 100$
{200} oriented Cu crystal: $S_{200}=\{(I_{200}/IA_{200})/T\} \times 100$
{220} oriented Cu crystal: $S_{220}=\{(I_{220}/IA_{220})/T\} \times 100$
{311} oriented Cu crystal: $S_{311}=\{(I_{311}/IA_{311})/T\} \times 100$
wherein each of $I_{111}$, $I_{200}$, $I_{220}$ and $I_{311}$ is a measurement (cps) of an intensity of X-ray reflected from each of the crystal planes, and each of $IA_{111}$, $IA_{200}$, $IA_{220}$ and $IA_{311}$ is an intensity ratio of X-rays reflected from the crystal planes in an ASTM card, $IA_{111}=100$; $IA_{200}=46$; $IA_{220}=20$; and $IA_{311}=17$. Further, $T=(I_{111}/IA_{111})+(I_{200}/IA_{200})+(I_{220}/IA_{220})+(I_{311}/IA_{311})$.

Figure 16A:
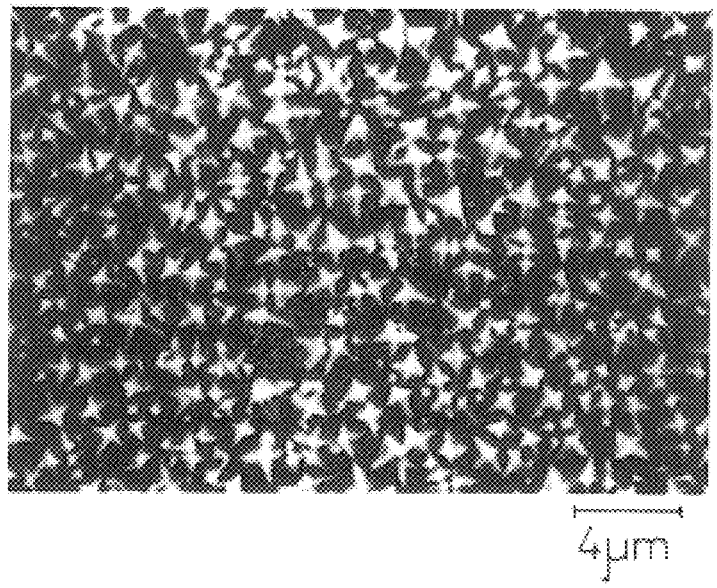
FIG. 16A is a photomicrograph showing the crystal form of a skin film surface of the example 1.
Figure 16B:
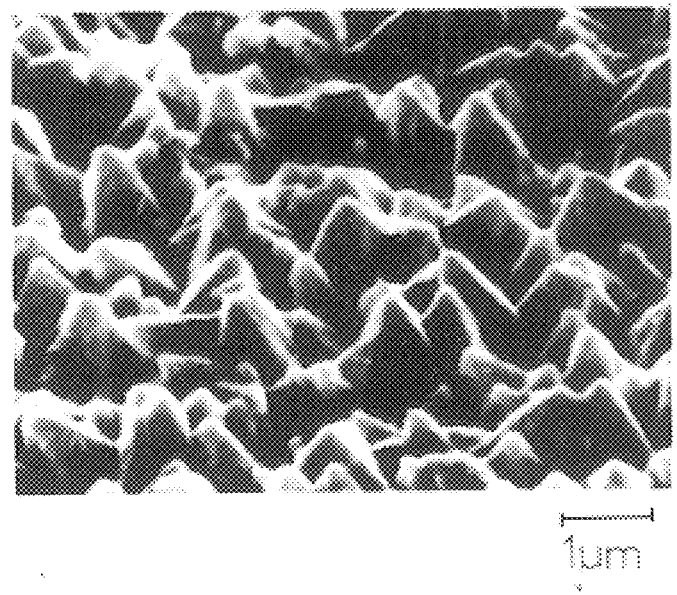
FIG. 16B is an enlarged perspective photograph taken from FIG. 16A.

FIGS. 16A and 16B are photomicrographs showing the crystal form of the skin film surface for the example 1, wherein a large number of tetragonal pyramid-shaped Cu crystals are observed. In this case, the area rate A of the tetragonal pyramid-shaped Cu crystals is equal to 100%, as shown in Table 7. Each of the tetragonal pyramid-shaped Cu crystals is a {200} oriented Cu crystal with its {200} plane oriented toward the skin film surface. The content S of these {200} oriented Cu crystals is equal to 98.1%, as shown in FIG. 12.

Figure 17:
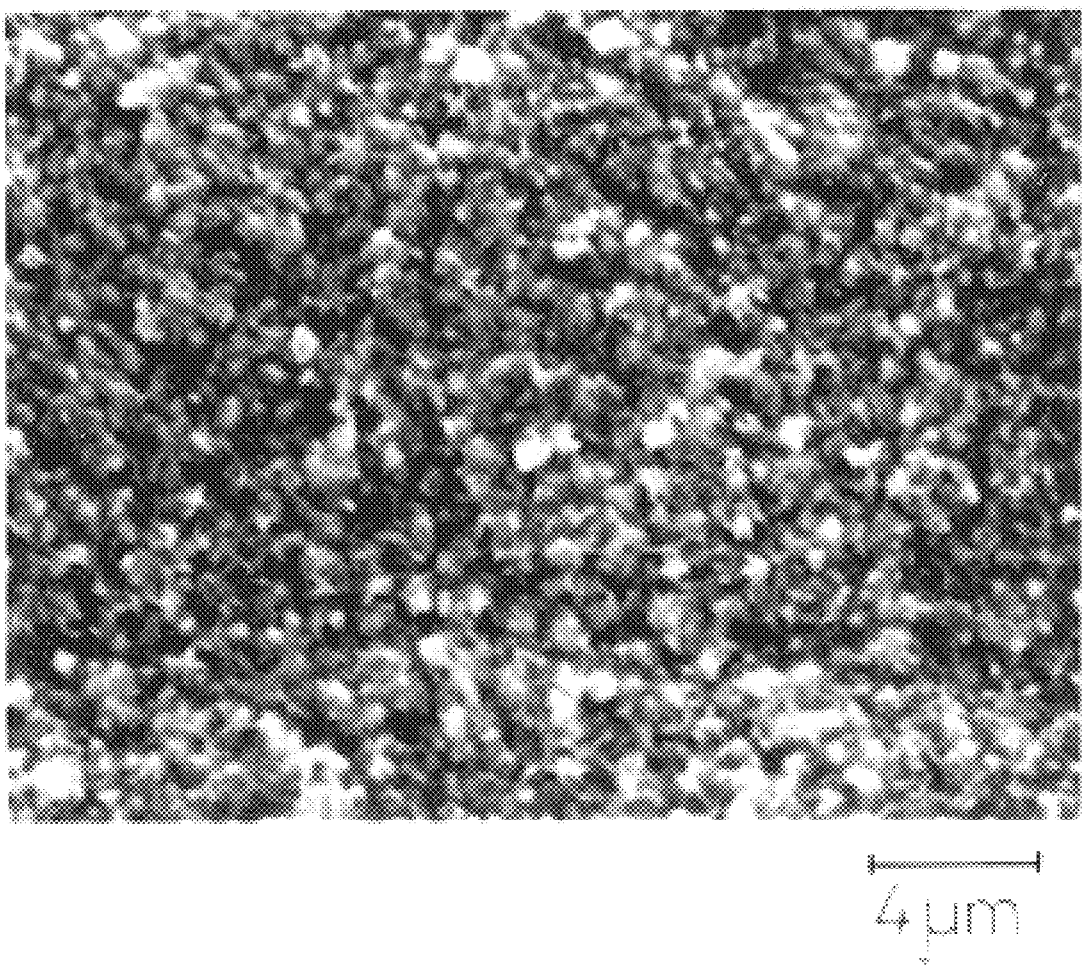
FIG. 17 is a photomicrograph showing the crystal form of a skin film surface of the example 7.

FIG. 17 is a photomicrograph showing the crystal form of the skin film surface for the example 7, wherein a large number of granular Cu crystals are observed. In this case, the contents S of the oriented Cu crystals are substantially equal to one another, as shown in Table 7 and FIG. 13.

Figure 18A:
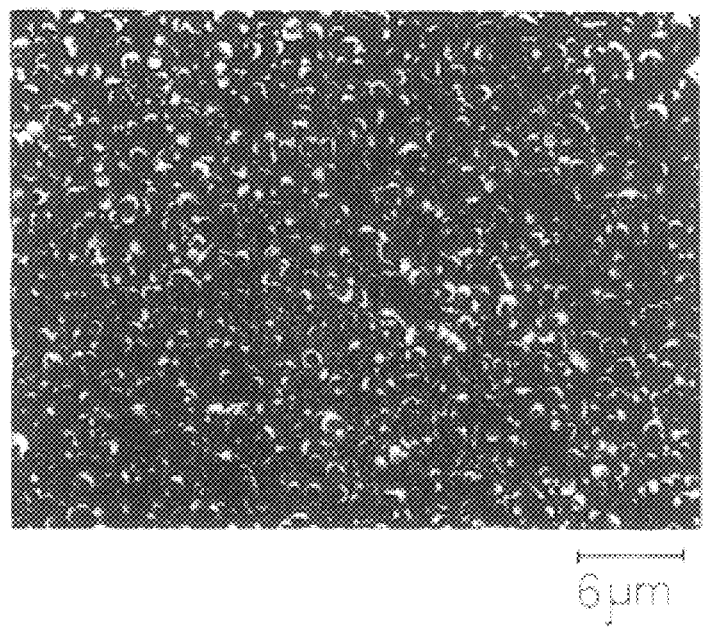
FIG. 18A is a photomicrograph showing the crystal form of a skin film surface of the example 8.
Figure 18B:
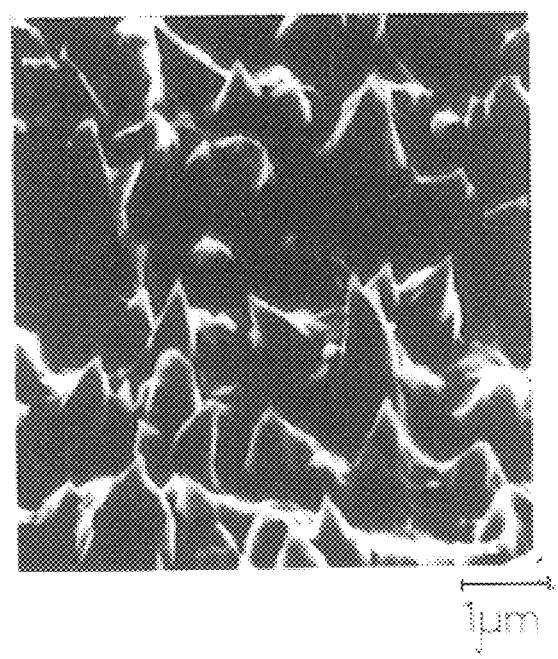
FIG. 18B is an enlarged perspective photograph taken from FIG. 18A.

FIGS. 18A and 18B are photomicrographs showing the crystal form of the skin film surface for the example 8, wherein a large number of conical Cu crystals are observed. In this case, the area rate A of the conical Cu crystals is equal to 100%, as shown in Table 8. Each of the conical Cu crystals is a {200} oriented Cu crystal with its {200} plane oriented toward the skin film surface. The content S of these {200} oriented Cu crystals is equal to 96.2%, as shown in Table 8 and FIG. 14.

Figure 19A:
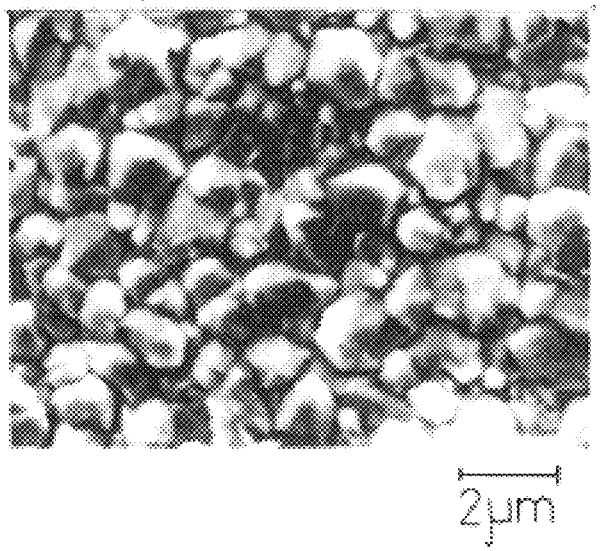
FIG. 19A is a photomicrograph showing the crystal form of a skin film surface of the example 14.
Figure 19B:
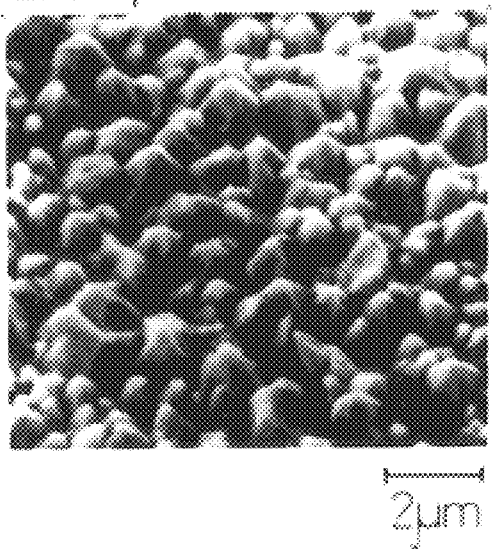
FIG. 19B is a perspective photograph taken from FIG. 19A.

FIGS. 19A and 19B are photomicrographs showing the crystal form of the skin film surface for the example 14, wherein a large number of hexagonal pyramid-shaped Cu crystals are observed. In this case, the area rate A of the hexagonal pyramid-shaped Cu crystals is equal to 80%. as shown in Table 9. Each of the hexagonal pyramid-shaped Cu crystals is a {111} oriented Cu crystal with its (hhh) plane, i.e., {111} plane oriented toward the skin film surface. The content S of the {111} oriented Cu crystals is equal to 81.1%, as shown in Table 9 and FIG. 15.

Then, chips having the structures of the examples 1 to 21 were fabricated and subjected to a seizure test in a chip-on-disk manner to measure the seizure generating load. In this case, the material for a disk was a chromemolybdenum steel (JIS SCM420, carburized material); the peripheral speed of the disk was set at 1 m/sec; the amount of oil supplied was set at 1 cc/min; and the area of the skin film surface of the chip was set at 10 mm$^2$.

Two substances, 10W-30 (in a SAE viscosity specification) and PAMA (polyalkylmethacrylate), were used as lubricating agents. The 10W-30 was supplied by a pump, and the PAMA was supplied by a pneumatic cylinder. Table 11 shows the relationship between the temperature and the dynamic viscosity for the two lubricating agents.

TABLE 11

| Lubricating agent | 20° C. | 100° C. | 119.4° C. | 121.2° C. |
|---|---|---|---|---|
| 10W-30 | 1.19 × 10$^2$ cSt | — | — | — |
| PAMA | 1.29 × 10$^5$ cSt | 1.15 × 10$^3$ cSt | 1 × 10$^3$ cSt | 9 × 10$^2$ cSt |

Table 12 shows the measurement results provided using the 10W-30 at 20° C. as the lubricating agent, and Table 13 shows the measurement results provided using the PAMA at 20° C. as the lubricating agent. At this temperature, the dynamic viscosity of the PAMA is higher than that of the 10W-30, as shown in Table 11.

TABLE 12

Lubricating agent: 10W-30 (at 20° C.)

| Cu skin film | Seizure generating load (N) | Cu skin film | Seizure generating load (N) |
|---|---|---|---|
| Example 1 | 1300 | Example 11 | 700 |
| Example 2 | 1100 | Example 12 | 300 |
| Example 3 | 900 | Example 14 | 1200 |
| Example 4 | 700 | Example 15 | 900 |
| Example 5 | 300 | Example 16 | 700 |
| Example 6 | 1200 | Example 17 | 360 |
| Example 7 | 200 | Example 18 | 1400 |
| Example 8 | 1000 | Example 20 | 1300 |
| Example 9 | 900 | Example 21 | 1350 |
| Example 10 | 900 | | |

TABLE 13

Lubricating agent: PAMA (at 20° C.)

| Cu skin film | Seizure generating load (N) | Cu skin film | Seizure generating load (N) |
|---|---|---|---|
| Example 1 | 1100 | Example 11 | 800 |
| Example 2 | 1000 | Example 12 | 400 |
| Example 3 | 1000 | Example 13 | 1300 |
| Example 4 | 800 | Example 14 | 1000 |
| Example 5 | 400 | Example 15 | 1000 |
| Example 7 | 300 | Example 16 | 800 |
| Example 8 | 1500 | Example 17 | 400 |
| Example 9 | 1200 | Example 19 | 1300 |
| Example 10 | 1000 | Example 21 | 1150 |

Figure 20:
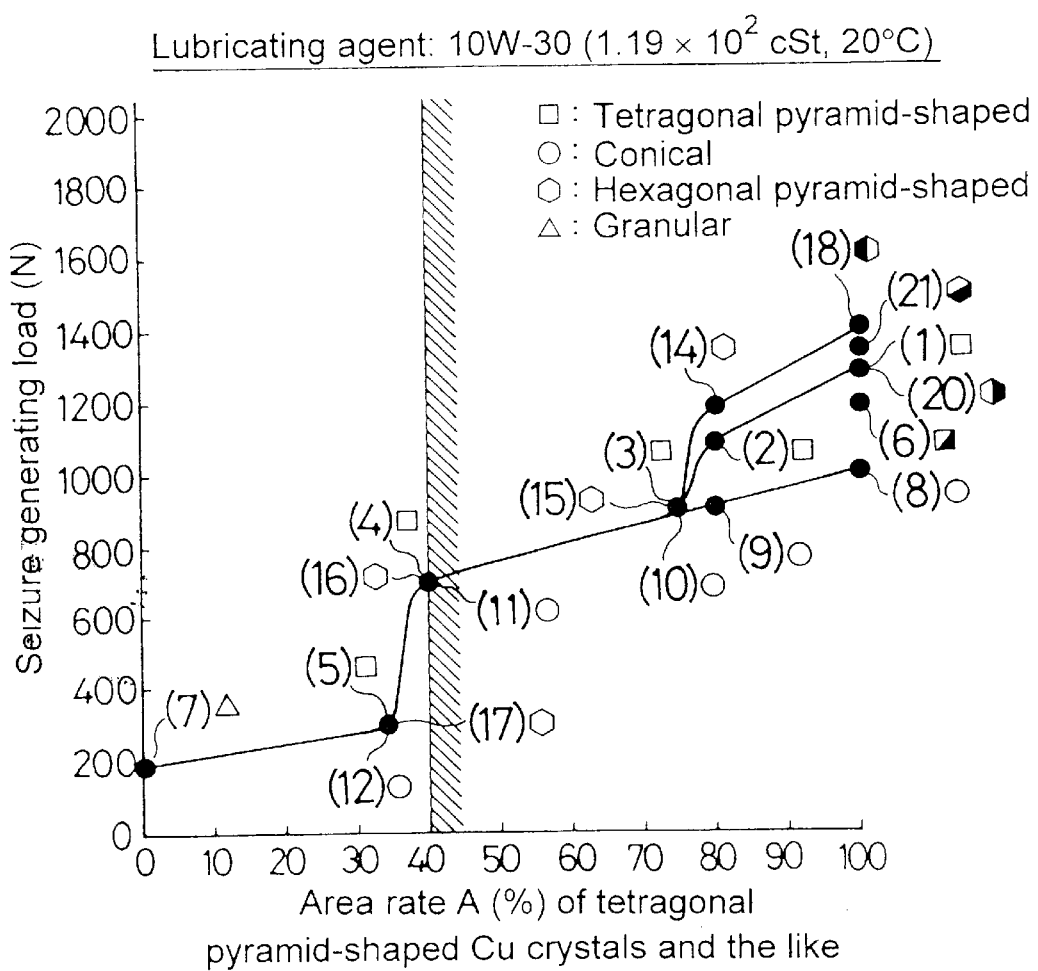
FIG. 20 is a graph illustrating one example of the relationship between the area rate A of tetragonal pyramid-shaped Cu crystals and the seizure generating load.

FIG. 20 shows the relationship between the area rate A of the tetragonal pyramid-shaped Cu crystals and the like and the seizure generating load, when the 10W-30 was used as the lubricating agent. In FIG. 20, points (1) to (12), (14) to (18), (20) and (21) correspond to the examples 1 to 12, 14 to 18, 20 and 21, respectively. The relationship between the points and the examples applies to Figures which will be described hereinafter. It can be seen from FIG. 20 that the seizure generating load is substantially high, when the area rate A of the tetragonal pyramid-shaped Cu crystals and the like is in the range of A≧40%.

If the examples 3 to 5 and 15 to 17 are compared with the examples 10 to 12, there is no difference in seizure resistance if the area rate A is in a range of 35%≦A≦75 %, whether the Cu crystals existing in the skin film surface are tetragonal and hexagonal pyramid-shaped or conical.

However, if the area rate A is larger than 75%, the seizure resistance of the examples 1, 2, 6, 14, 18, 20 and 21 having the tetragonal and hexagonal pyramid-shaped Cu crystals existing in the skin film surface is remarkably increased more than that of the examples 8 and 9 having the conical Cu crystals existing in the skin film surface. This is due to the fact that in the examples 1 and the like, a good oil retention is insured, while the flowability of the 10W-30 having the low dynamic viscosity is maintained, because the aspect of the skin film surface of the examples 1 and the like is complicated, as compared with that of the examples 8 and the like.

If the example 2 is compared with the example 14, it can be seen that in order to enhance the seizure resistance, the hexagonal pyramid-shaped Cu rather than the tetragonal pyramid-shaped Cu crystals should exist in the skin film surface.

The example 6 is superior in seizure resistance to the example 2, but inferior in seizure resistance to the example 1, because the area rate A of the tetragonal pyramid-shaped Cu crystals is equal to 80% and the area rate A of the conical Cu crystals is equal to 20% in the example 6. In addition, the seizure generating load in the example 21 is higher than that in the example 20 due to the existing of the tetragonal pyramid-shaped Cu crystals.

Such a phenomenon is attributable to the fact that the magnitude of the flow resistance of the tetragonal and hexagonal pyramid-shaped and conical Cu crystals is in a relation of hexagonal pyramid-shaped Cu crystals>tetragonal pyramid-shaped Cu crystals>conical Cu crystals.

Figure 21:
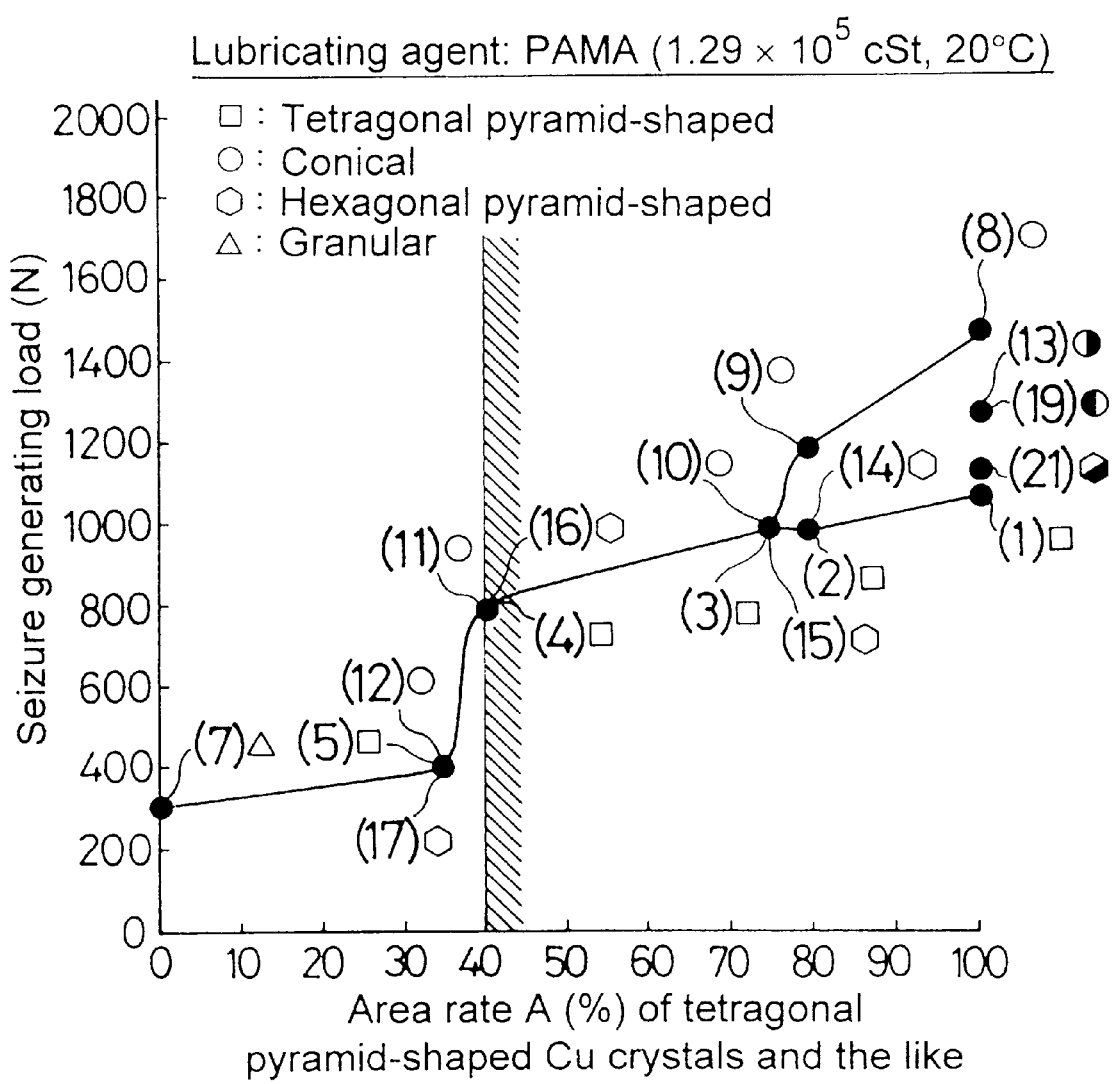
FIG. 21 is a graph illustrating another example of the relationship between the area rate A of the tetragonal pyramid-shaped Cu crystals and the seizure generating load.

FIG. 21 shows the relationship between the area rate A of the tetragonal pyramid-shaped Cu crystals and the like and the seizure generating load when the PAMA was used as the lubricating agent. It can be seen from FIG. 21 that the seizure generating load is remarkably increased, when the area rate A of the tetragonal pyramid-shaped Cu crystals and the like is in the range of A≧40%.

If the examples 10 to 12 are compared with the examples 3 to 5 and 15 to 17, there is no difference in seizure resistance if the area rate A is in the range of 35%≦A≦75%, whether the Cu crystals existing in the skin film surface are conical or tetragonal and hexagonal pyramid-shaped.

However, if the area rate A is larger than 75%, the seizure resistance of the examples 8, 9, 13 and 19 having the conical Cu crystals existing in the skin film surface is remarkably increased more than that of the examples 1, 2, 14 and 21 having the tetragonal and hexagonal pyramid-shaped Cu crystals existing in the skin film surface. This is due to the fact that in the examples 8 and the like, a good oil retention is insured, while the flowability of the PAMA having the high dynamic viscosity is maintained, because the aspect of the skin film surface of the examples 8 and the like is simple, as compared with that of the examples 1 and the like.

The example 13 is superior in seizure resistance to the example 9, but inferior in seizure resistance to the example 8, because the area rate A of the conical Cu crystals is equal to 80% and the area rate A of the tetragonal pyramid-shaped Cu crystals is equal to 20% in the example 13.

Then, using chips of the structures of the examples 1 and 8 and selecting PAMA at 100° C., 119.4° C. and 121.2° C., a seizure test similar to that described above was carried out to provide results given in Table 14. Data for the examples 1 and 8 (using 10W-30 and PAMA at 20° C.) shown in Table 13 are also given in Table 14.

TABLE 14

| Dynamic viscosity v (cSt) of lubricating agent | Seizure generating load (N) | |
| --- | --- | --- |
| | Example 1 | Example 8 |
| 1.19 × 10² (20° C., 10W-30) | 1300 | 1000 |
| 9 × 10² (121.2° C.) | 1210 | 1190 |
| 1 × 10³ (119.4° C.) | 1200 | 1200 |
| 1.15 × 10³ (100° C.) | 1190 | 1220 |
| 1.29 × 10⁵ (20° C.) | 1100 | 1500 |

Figure 22:
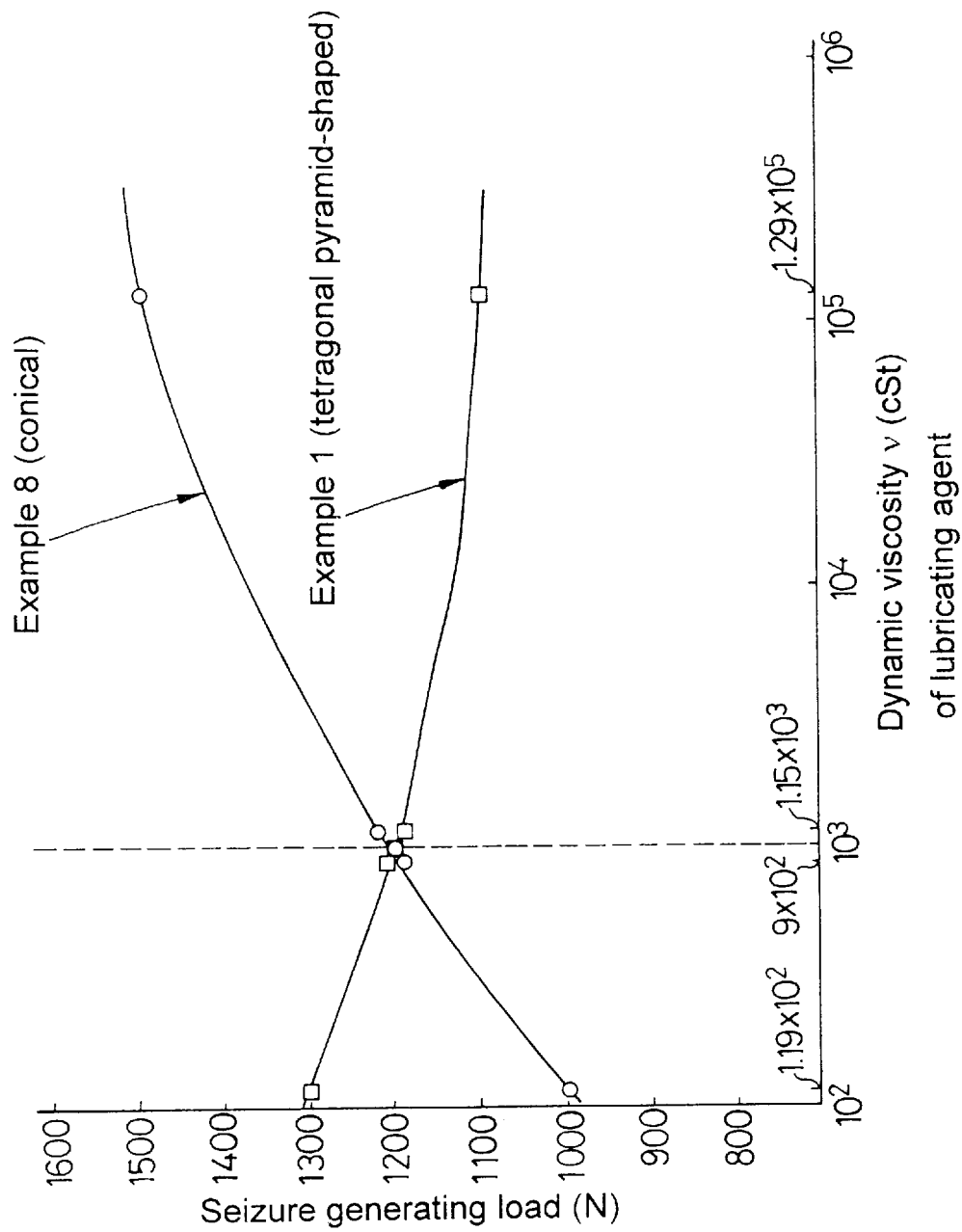
FIG. 22 is a graph illustrating the relationship between the dynamic viscosity of a lubricating agent and the seizure generating load.

FIG. 22 shows the relationship between the dynamic viscosity υ of the lubricating agent and the seizure generating load. As apparent from FIG. 22, if the lubricating agent having a dynamic viscosity υ equal to or lower than $10^3$ cSt is used for the Cu skin film having the tetragonal pyramid-shaped Cu crystals in the skin film surface, the seizure resistance can be enhanced. On the other hand, if the lubricating agent having a dynamic viscosity υ equal to or higher than $10^3$ cSt is used for the Cu skin film having the conical Cu crystals in the skin film surface, the seizure resistance can be enhanced.

Then, chips having the structures of the examples 1, 2, 4, 5, 7, 8, 9, 11, 12, 14, 16 and 17 were fabricated and subjected to a wear test in a chip-on-disk manner under lubrication to measure the wear amount for these examples 1 and the like, thereby providing results given in Table 15. In this case, the material for the disk was chromemolybdenum steel (JIS SCM420, carburized material); the peripheral speed of the disk was set at 10 m/sec; the pressing load on the chip was set at 200 N; the sliding distance was set at 20 km; and the area of the skin film surface of the chip was set at 1 cm². The wear amount was a difference between the thickness values of the chip before and after the test, and the thickness was determined using a micrometer.

TABLE 15

| Cu skin film | Wear amount (μm) |
| --- | --- |
| Examples 1 and 8 | 2.5 |
| Examples 2, 9 and 14 | 2.5 |
| Examples 4, 11 and 16 | 3 |
| Examples 5, 12 and 17 | 4.5 |
| Example 7 | 5 |

Figure 23:
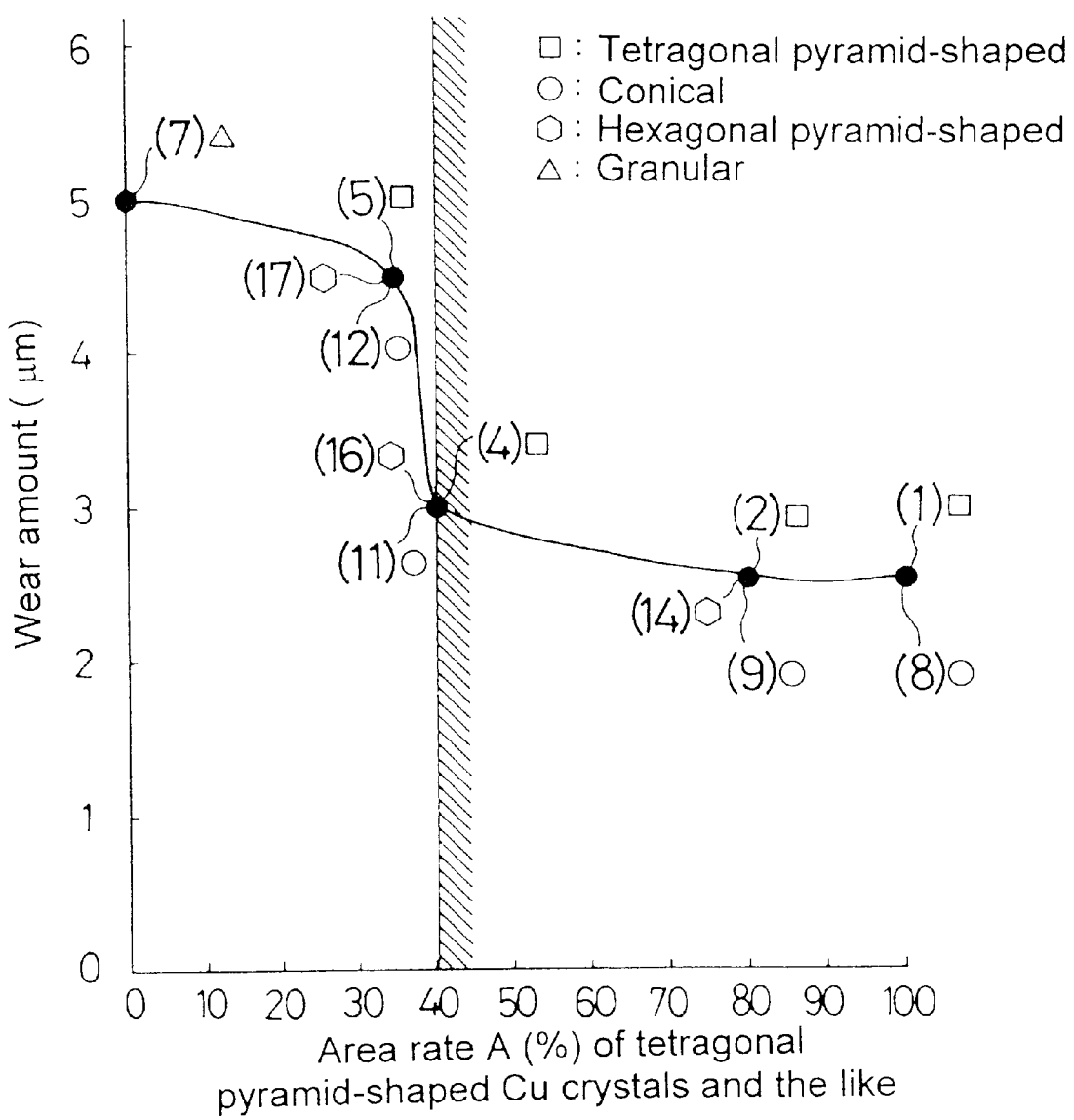
FIG. 23 is a graph illustrating the relationship between the area rate A of the tetragonal pyramid-shaped Cu crystals and the wear amount.

FIG. 23 shows the relationship between the area rate A of the tetragonal pyramid-shaped Cu crystals and the wear amount. It can be seen from FIG. 23 that the wear amount is remarkably decreased, when the area rate A of the tetragonal pyramid-shaped Cu crystals and the like is in the range of A≧40%.

If the examples 1, 2, 4 and 5 are compared with the examples 8, 9, 11 and 12 and the examples 14, 16 and 17, there is no difference in wear resistance if these examples have the same area rate A, whether the Cu crystals existing in the skin film surface are tetragonal and hexagonal pyramid-shaped or conical. This is because the wear resistance of the Cu skin film depends upon the fine division of the sliding load by the tetragonal and hexagonal pyramid-shaped Cu crystals and the conical Cu crystals. Therefore, the higher the area rate A of the tetragonal pyramid-shaped Cu crystals and the like, the more the wear resistance of the Cu skin film is enhanced.

The first embodiment is not limited to the slide bearing used at the larger end of the connecting rod, but rather is also applicable to slide bearings and the like used on journal portions such as a crankshaft, a cam shaft and the like.

(Second Embodiment)

A second embodiment will be described by way of an energy absorbing skin film which is capable of absorbing energy such as heat and light.

1. Heat energy absorbing skin film

A Cu skin film formed of an aggregate of Cu crystals and having a thickness of 15 μm was formed on t he entire surface of a square bar made of copper (JIS C1020) and having a height of 10 mm, a width of 10 mm, and a length of 50 mm by subjecting such entire surface to an electrolytic Cu plating process.

In this case, examples of the Cu skin films correspond to the examples 1, 2, 4, 5, 7 to 9, 11 to 14 and 16 to 21 in the first embodiment. Therefore, in this item, the expression of the examples 1 and the like in the first embodiment is directly used for the examples of the Cu skin films.

Then, a thermocouple was inserted into a blind hole opening into one end face of the square bar having the example 1, and a nitrogen (N²) gas controlled to a temperature of 100° C. and a mass flow rate of 2 SLM (2 liter/min) was blown to the example 1 from the other end face of the square bar to measure the rate of temperature increase of the square bar as a result of the blowing by the thermocouple. The measurement was carried out even for other examples 2, 4 and 5 and the like.

Tables 16 and 17 show the crystal form of the skin film surface, the area rate A of the hexagonal and tetragonal pyramid-shaped and conical Cu crystals, and the rate of temperature rise or increase for the examples, with Table 16 corresponding to the examples 1, 2, 4, 5, 7 to 9 and 11 to 13, and Table 17 corresponding to the examples 14 and 16 to 21. The crystal form and the area rate A are shown by transcription from Tables 7 to 10.

TABLE 16

| Cu skin film | Crystal form of skin film surface | Area rate A (%) tetragonal pyramid-shaped and conical Cu crystals | Rate of temperature rise (° C./min) |
| --- | --- | --- | --- |
| Example 1 | Tetragonal pyramid-shaped | 100 | 6.5 |
| Example 2 | Tetragonal pyramid-shaped Granular | 80 — | 6.2 |
| Example 4 | Tetragonal pyramid-shaped Granular | 40 — | 5 |
| Example 5 | Tetragonal pyramid-shaped Granular | 35 — | 3.5 |
| Example 7 | Granular | 0 | 2.8 |
| Example 8 | Conical | 100 | 8 |
| Example 9 | Conical Granular | 80 — | 7.3 |
| Example 11 | Conical Granular | 40 — | 5 |
| Example 12 | Conical Granular | 35 — | 3.5 |
| Example 13 | Conical Tetragonal pyramid-shaped | 80 20 | 7.5 |

TABLE 17

| Cu skin film | Crystal form of skin film surface | Area rate A (%) tetragonal pyramid-shaped and conical Cu crystals | Rate of temperature rise (° C./min) |
| --- | --- | --- | --- |
| Example 14 | Hexagonal pyramid-shaped Granular | 80 — | 7.5 |
| Example 16 | Hexagonal pyramid-shaped Granular | 40 — | 5 |
| Example 17 | Hexagonal pyramid-shaped Granular | 35 — | 3.5 |
| Example 18 | Hexagonal pyramid-shaped Tetragonal pyramid-shaped | 80 20 | 7.6 |
| Example 19 | Conical Hexagonal pyramid-shaped | 80 20 | 8 |
| Example 20 | Hexagonal pyramid-shaped Conical | 80 20 | 8.1 |
| Example 21 | Hexagonal pyramid-shaped Tetragonal pyramid-shaped Conical | 80 10 10 | 7.8 |

Figure 24:
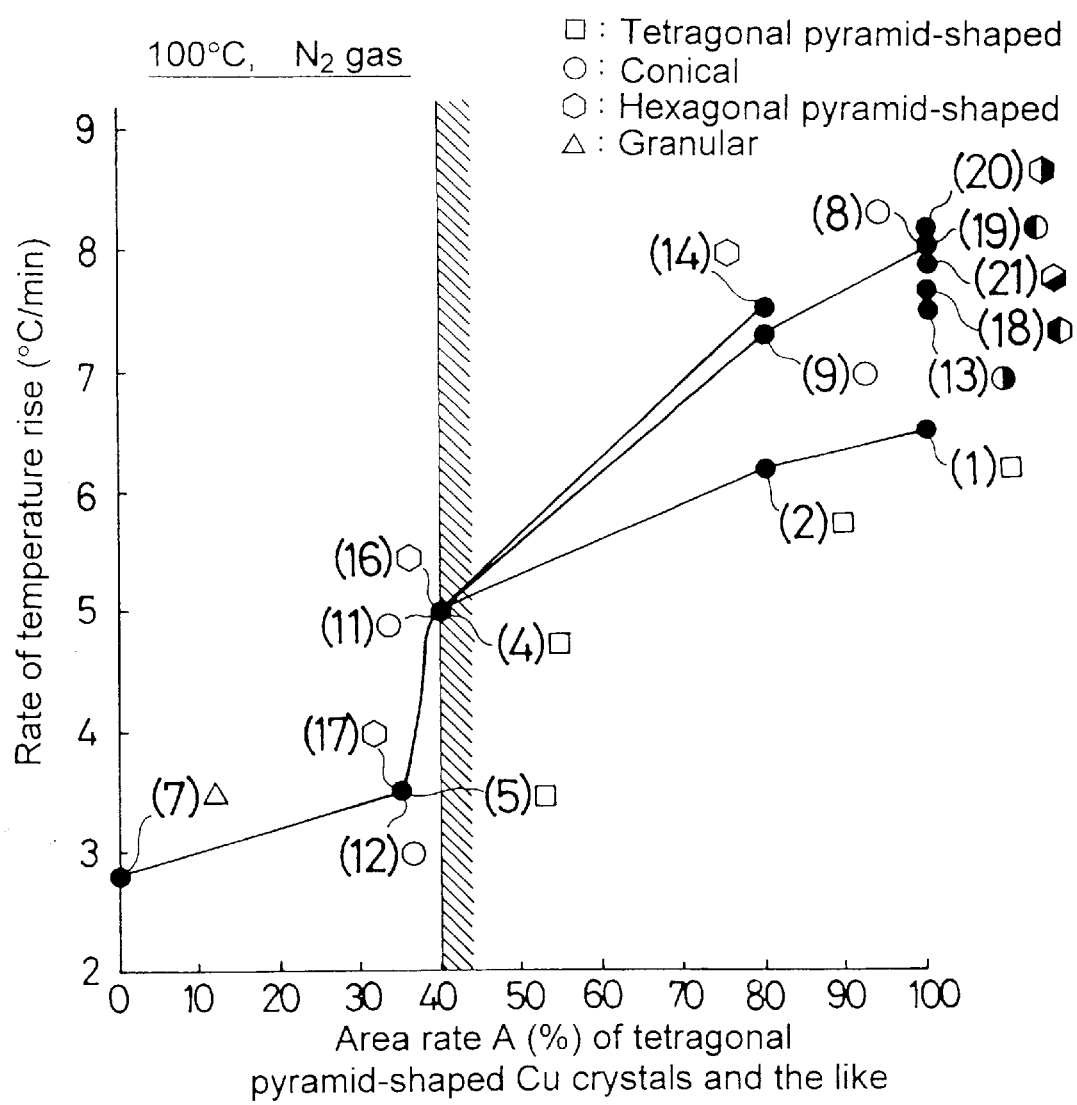
FIG. 24 is a graph illustrating one example of the relationship between the area rate A of the tetragonal pyramid-shaped Cu crystals and the rate of temperature rise.

FIG. 24 is a graph which shows the relationship between the area rate A of the tetragonal pyramid-shaped Cu crystals and the like and the rate of temperature rise and which is taken from Tables 16 and 17.

As is apparent from FIG. 24, the examples 1, 2, 4, 8, 9, 11, 13, 14, 16 and 18 to 21 are high in rate of temperature rise, namely, high in heat energy absorbing ability, as compared with the examples 5, 7, 12 and 17. From this, it can be seen that in order to enhance the heat energy absorbing efficiency, the area rate A of the tetragonal pyramid-shaped Cu crystals and the like in the skin film surface may be set in the range of A≧40%.

If the examples 1, 2, 4 and 5 are compared with the examples 8, 9, 11 and 12 and the examples 14, 16 and 17, there is no difference in heat energy absorbing ability, if the area rate A is in the range of A≦40%, whether the Cu crystals existing in the skin film surface are tetragonal and hexagonal pyramid-shaped, or conical.

However, if the area rate A is larger than 40%, the heat energy absorbing ability of the examples 8, 9 and 14 having the conical and hexagonal pyramid-shaped Cu crystals existing in the skin film surface is higher than that of the examples 1 and 2 having the tetragonal pyramid-shaped Cu crystals existing in the skin film surface. Even from the comparison of the examples 19 to 21 and the examples 13 and 18 with each other, it can be seen that the heat energy absorbing ability by the conical and hexagonal pyramid-shaped Cu crystals is remarkable. Further, from the comparison of the examples 9 and 14 with each other, the examples 13 and 18 with each other and the examples 19 and 20 with each other, it is apparent that the hexagonal pyramid-shaped Cu crystals have the superior heat energy absorbing ability to the conical Cu crystals.

Therefore, it may be safely mentioned that in order to enhance the heat energy absorbing ability, the existence of the conical and hexagonal pyramid-shaped Cu crystals is more advantageous than the existence of the tetragonal pyramid-shaped Cu crystals. This is attributable to the magnitude of the flow resistance and the surface area of the skin film surface.

This is because the magnitude of the flow resistance of the tetragonal and hexagonal pyramid-shaped and conical Cu crystals is in the relation of hexagonal pyramid-shaped Cu crystals>tetragonal pyramid-shaped Cu crystals>conical Cu crystals; the magnitude of the surface area of the tetragonal and hexagonal pyramid-shaped and conical Cu crystals is in a relation of hexagonal pyramid-shaped and conical Cu crystals>tetragonal pyramid-shaped Cu crystals; and the heat energy absorbing ability largely depends on the surface area.

2. Light energy absorbing skin film (a) Light energy absorbing efficiency

A Cu skin film formed of an aggregate of Cu crystals and having a thickness of 15 μm was formed on one surface of a thin plate made of a copper (JIS C1020)and having a height of 20 mm, a width of 10 mm, and a thickness of 0.3 mm by subjecting such surface to an electrolytic Cu plating process.

In this case, examples of the Cu skin films correspond to the examples 1, 2, 4, 5, 7 to 9, 11 to 14 and 16 to 21. Therefore, in this section, the expression of the examples 1, and the like in the first embodiment is directly used for the examples of the Cu skin films.

Then, a measuring element of a resistance thermometer was brought into close contact with a surface of the example 1 in the thin plate. Thereafter, He-Ne laser beams were applied to the surface of the example 1 at room temperature (20° C.) under conditions of a wave length λ of 0.6328 μm; an output of 2 m W and a beam diameter of 1 mm to measure the rate of temperature rise of the surface of the example 1 during application of the laser beams by the resistance thermometer. The measurement was carried out even for other examples 2, 4 and 5 and the like.

Tables 18 and 19 show the crystal form of the skin film surface, the area rate A of the hexagonal and tetragonal pyramid-shaped and conical Cu crystals, and the rate of temperature rise for the examples, with Table 18 corresponding to the examples 1, 2, 4, 5, 7 to 9 and 11 to 13, and Table 19 corresponding to the examples 14 and 16 to 21. The crystal form and the area rate A are shown by transcription from Tables 7 to 10. The average grain size d of the tetragonal pyramid-shaped Cu crystals and the like in each of the examples is equal to 1 μm.

TABLE 18

| Cu skin film | Crystal form of skin film surface | Area rate A (%) tetragonal pyramid-shaped and conical Cu crystals | Rate of temperature rise (° C./min) |
|---|---|---|---|
| Example 1 | Tetragonal pyramid-shaped | 100 | 1.1 |
| Example 2 | Tetragonal pyramid-shaped Granular | 80 — | 1 |
| Example 4 | Tetragonal pyramid-shaped Granular | 40 — | 0.8 |
| Example 5 | Tetragonal pyramid-shaped Granular | 35 — | 0.5 |
| Example 7 | Granular | 0 | 0.3 |
| Example 8 | Conical | 100 | 1.7 |
| Example 9 | Conical Granular | 80 — | 1.5 |
| Example 11 | Conical Granular | 40 — | 0.8 |
| Example 12 | Conical Granular | 35 — | 0.5 |
| Example 13 | Conical Tetragonal pyramid-shaped | 80 20 | 1.6 |

TABLE 19

| Cu skin film | Crystal form of skin film surface | Area rate A (%) tetragonal pyramid-shaped and conical Cu crystals | Rate of temperature rise (° C./min) |
|---|---|---|---|
| Example 14 | Hexagonal pyramid-shaped Granular | 80 — | 1.5 |
| Example 16 | Hexagonal pyramid-shaped Granular | 40 — | 0.8 |
| Example 17 | Hexagonal pyramid-shaped Granular | 35 — | 0.5 |
| Example 18 | Hexagonal pyramid-shaped Tetragonal pyramid-shaped | 80 20 | 1.6 |
| Example 19 | Conical Hexagonal pyramid-shaped | 80 20 | 1.7 |
| Example 20 | Hexagonal pyramid-shaped Conical | 80 20 | 1.7 |
| Example 21 | Hexagonal pyramid-shaped Tetragonal pyramid-shaped Conical | 80 10 10 | 1.65 |

Figure 25:
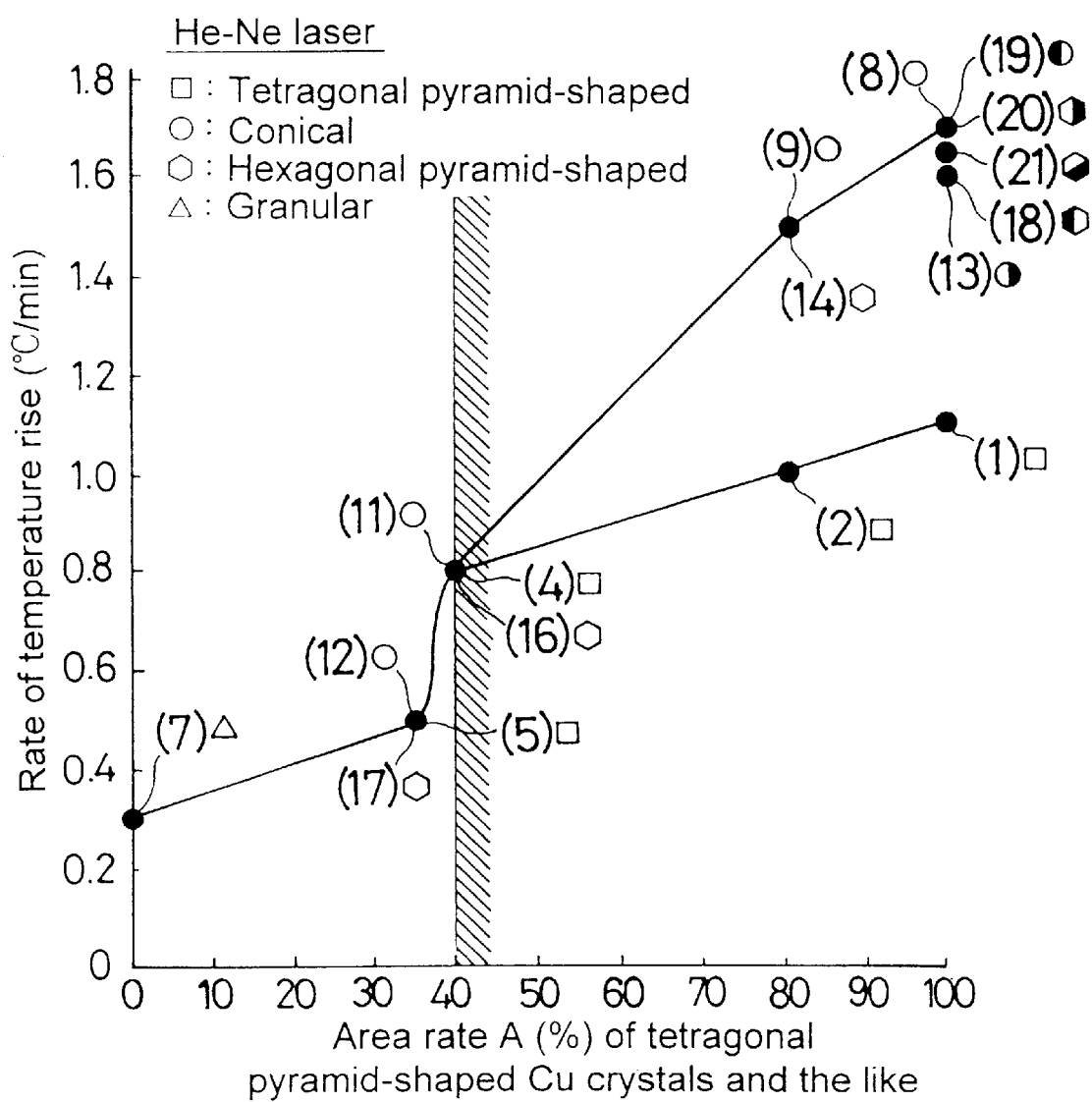
FIG. 25 is a graph illustrating another example of the relationship between the area rate A of the tetragonal pyramid-shaped Cu crystals and the rate of temperature rise.

FIG. 25 is a graph which shows the relationship between the area rate A of the tetragonal pyramid-shaped Cu crystals and the like and the rate of temperature rise and which is taken from Tables 18 and 19.

As is apparent from FIG. 25, the examples 1, 2, 4, 8, 9, 11, 13, 14, 16 and 18 to 21 are high in rate of temperature rise, namely, high in light energy absorbing ability, as compared with the examples 5, 7, 12 and 17. From this, it can be seen that in order to enhance the light energy absorbing efficiency, the area rate A of the tetragonal pyramid-shaped Cu crystals and the like in the skin film surface may be set in the range of A≧40%.

If the examples 1, 2, 4 and 5 are compared with the examples 8, 9, 11 and 12 and the examples 14, 16 and 17, there is no difference in light energy absorbing ability, if the area rate A is in the range of A≦40%, whether the Cu crystals existing in the skin film surface are tetragonal and hexagonal pyramid-shaped, or conical.

However, if the area rate A is larger than 40%, the light energy absorbing ability of the examples 8, 9 and 14 having the conical and hexagonal pyramid-shaped Cu crystals existing in the skin film surface is higher than that of the examples 1 and 2 having the tetragonal pyramid-shaped Cu crystals existing in the skin film surface. Even from the comparison of the examples 19 to 21 and the examples 13 and 18 having the same area rate A with each other, it can be seen that the light energy absorbing ability by the conical and hexagonal pyramid-shaped Cu crystals is remarkable.

Therefore, it may be safely mentioned that in order to enhance the light energy absorbing ability, the existence of the conical and hexagonal pyramid-shaped Cu crystals is more advantageous than the existence of the tetragonal pyramid-shaped Cu crystals. This is attributable to the magnitude of the valley in the skin film surface and the surface area of the skin film surface. This is because the magnitude of the angle formed by the slope and the bottom surface in the tetragonal and hexagonal pyramid-shaped and conical Cu crystals is in a relation of hexagonal pyramid-shaped conical Cu crystals (70°)>tetragonal pyramid-shaped Cu crystals (54°), and the magnitude of the surface area of the tetragonal and hexagonal pyramid-shaped and conical Cu crystals is in a relation of hexagonal pyramid-shaped and conical Cu crystals>tetragonal pyramid-shaped Cu crystals.

(b) Relation between light energy absorbing ability and ratio d/λ of average grain size d to wave length λ of beams In order to remarkably reduce the probability that beams applied to the skin film surface emerge from the valley between the adjacent tetragonal pyramid-shaped Cu crystals and the like, thereby enhancing the light energy absorbing efficiency of the skin film, it is necessary to establish a predetermined relationship between the depth of the valley, i.e., the height of the tetragonal pyramid-shaped Cu crystals and the like and the wave length λ of the beams.

However, the tetragonal pyramid-shaped Cu crystals and the like are fine, and it is difficult to specify the height of the tetragonal pyramid-shaped Cu crystals and the like. Therefore, paying attention to the fact that in the tetragonal pyramid-shaped Cu crystals and the like, there is such an interrelation that if the height is increased, the average grain size d is accordingly increased, and the fact that the average grain size d is relatively easily determined from the photomicrograph, the relationship between the ratio d/λ of the average grain size d to the wave length λ of the beams and the light energy absorbing ability was examined in a manner which will be described below.

As in the above-described section (a), a Cu skin film formed of an aggregate of Cu crystals and having a thickness of 15 μm was formed on one surface of a thin plate made of copper (JIS C1020) and having a height of 20 mm, a width of 10 mm, and a thickness of 0.3 mm by subjecting such one surface to an electrolytic Cu plating process.

Table 20 shows conditions for the electrolytic Cu plating process for examples 22 to 27 of the Cu skin films.

TABLE 20

| | Plating bath | | | | | Pulse current process | | | | |
|---|---|---|---|---|---|---|---|---|---|---|
| | Composition (g/liter) | | | | | | | | | |
| Cu skin film | Cuprous cyanide | Sodium cyanide | Sodium carbonate | pH | Temperature (° C.) | CDmax (A/dm$^2$) | CDm (A/dm$^2$) | $T_{ON}/T_C$ | $T_{ON}$ (sec) | Plating time (min) |
| Example 22 | 80 | 90 | 30 | 10 | 80 | 12 | 9 | 0.75 | 12 | 6 |
| Example 23 | 80 | 90 | 30 | 10 | 80 | 12 | 9 | 0.75 | 12 | 5.5 |
| Example 24 | 80 | 90 | 30 | 10 | 80 | 45 | 9 | 0.2 | 2 (msec) | 5 |
| Example 25 | 80 | 90 | 30 | 10 | 80 | 45 | 9 | 0.2 | 2 (msec) | 4 |
| Example 26 | 90 | 90 | 0 | 10 | 80 | 10 | 2 | 0.2 | 2 (msec) | 25 |
| Example 27 | 90 | 90 | 0 | 10 | 80 | 10 | 2 | 0.2 | 2 (msec) | 20 |

Table 22 shows the crystal form of the skin film surface, the area rate A and grain size of the tetragonal pyramid-shaped, conical and hexagonal pyramid-shaped Cu crystals in the skin film surface, the content S of the oriented Cu crystals, and the hardness of a section of the Cu skin film for the examples 22 to 27.

TABLE 21

| | | Hexagonal pyramid-shaped Cu crystals | | Content S (%) of oriented Cu crystals | | | | Hardness |
|---|---|---|---|---|---|---|---|---|
| | Crystal form of | Area rate | Grain | | | | | |
| Cu skin film | skin film surface | A (%) | size (μm) | {111} | {200} | {220} | {311} | HmV |
| Example 22 | Tetragonal pyramid-shaped Granular | 80 — | 0.5–1 — | 10.8 | 81.4 | 4.1 | 3.7 | 170 |
| Example 23 | Tetragonal pyramid-shaped Granular | 80 — | 0.5–1 — | 11.1 | 81.8 | 4 | 3.1 | 170 |
| Example 24 | Conical Granular | 80 — | 0.5–1 — | 6.1 | 80.6 | 7 | 6.3 | 180 |
| Example 25 | Conical Granular | 80 — | 0.5–1 — | 5.9 | 80.5 | 7.5 | 6.1 | 180 |
| Example 26 | Hexagonal pyramid-shaped Granular | 80 — | 0.5–1 — | 80.9 | 7.2 | 7.6 | 4.3 | 170 |
| Example 26 | Hexagonal pyramid-shaped Granular | 80 — | 0.5–1 — | 80.7 | 6.8 | 7.9 | 4.6 | 170 |

The area rate A, the grain size and the content S in Table 21 were determined in the same manner as in the first embodiment.

Then, the rate of temperature rise of the surface of each of the examples 22 to 27 was measured in the same manner as in section (a).

Table 22 shows the main crystal form of the skin film surface, the average grain size d of the tetragonal pyramid-shaped Cu crystals and the like, the ratio d/λ (wherein λ=0.6328 μm), and the rate of temperature rise for the examples 22 to 27 and the above-described examples 2, 9 and 14. The area rate A in each of the examples is 80%.

TABLE 22

λ = 0.6328 μm

| Cu skin film | Crystal form | Average grain size d (μm) | Ratio d/λ | Rate of temperature rise (° C./min) |
|---|---|---|---|---|
| Example 2 | Tetragonal pyramid-shaped | 1 | 1.58 | 1 |
| Example 22 | | 0.92 | 1.45 | 1 |
| Example 23 | | 0.85 | 1.34 | 0.8 |
| Example 9 | Conical | 1 | 1.58 | 1.5 |
| Example 24 | | 0.46 | 0.73 | 1.5 |
| Example 25 | | 0.4 | 0.63 | 0.9 |
| Example 14 | Hexagonal pyramid-shaped | 1 | 1.58 | 1.5 |
| Example 26 | | 0.46 | 0.73 | 1.5 |
| Example 27 | | 0.4 | 0.63 | 0.9 |

Figure 26:
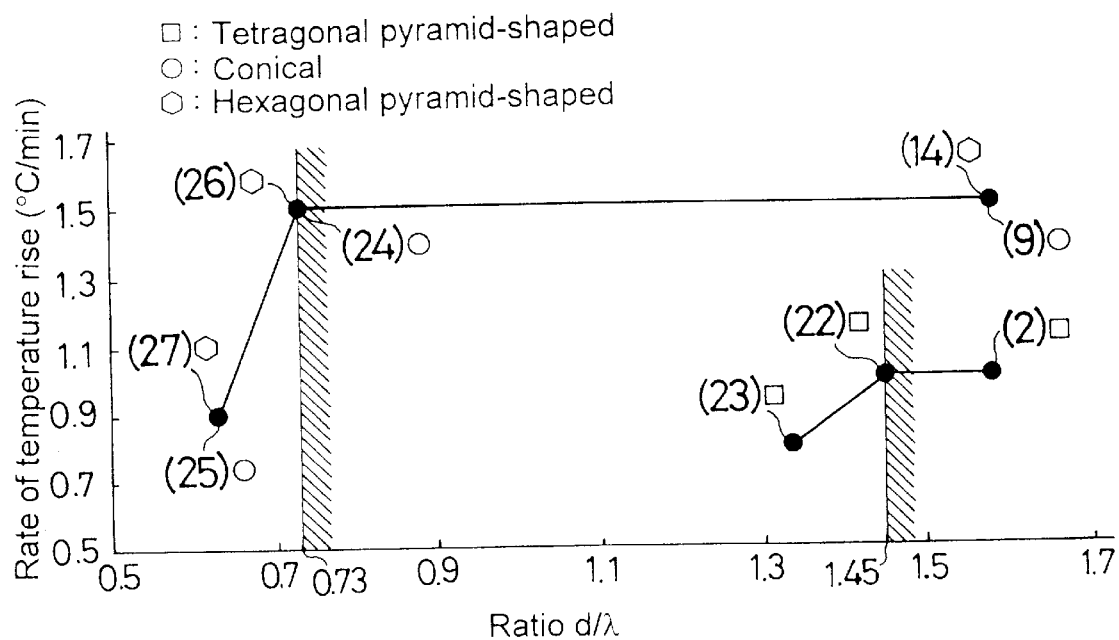
FIG. 26 is a graph illustrating the relationship between the ratio $d/\lambda$ and the rate of temperature rise.

FIG. 26 is a graph which shows the relationship between the ratio d/λ and the rate of temperature rise and which is taken from Table 22. As is apparent from FIG. 26, in order to increase the rate of temperature rise, namely, to enhance the light energy absorbing ability, the ratio d/λ may be set in a range of d/λ≧1.45, as in the examples 2 and 22, when the area rate A of the tetragonal pyramid-shaped Cu crystals in the skin film surface is in the range of A≧40%, and the ratio d/λ may be set in a range of d/λ≧0.73, as in the examples 9 and 24 and the examples 14 and 26, when the area rate A of the conical and hexagonal pyramid-shaped Cu crystals in the skin film surface is in the range of A≧40%.

In addition to the use in laser machining, the Cu skin film as the energy absorbing skin film is also applicable to a heat receiving plate for absorbing the heat of an exhaust gas, a light receiving plate in a heat exchanger utilizing solar heat, a reflection preventing film in a solar battery, and the like.

What is claimed is:

1. A surface construction formed as a slide surface on a substrate for sliding contact with a mating member, comprising, an aggregate of Cu crystals including conical-shaped Cu crystals on said substrate, wherein an area rate A of said conical-shaped Cu crystals which have one of (h00) and (hhh) planes, by Miller indices, directed toward the mating member, is equal to or greater than 40%.

2. A surface construction formed as a light energy absorber surface on a substrate for facing a light energy source having light beams of a wavelength λ to be absorbed, comprising, an aggregate of Cu crystals including both pyramid-shaped Cu crystals and conical-shaped Cu crystals on said substrate, wherein a sum A of an area rate of said pyramid-shaped Cu crystals and an area rate of said conical-shaped Cu crystals which have one of (h00) and (hhh) planes, by Miller indices, directed toward the light energy source, is equal to or greater than 40%, and wherein a ratio of average grain size d to the wavelength λ of the light beams to be applied to and absorbed by the light energy absorber surface is d/λ≧0.73.

3. A surface construction according to claim 2, wherein said pyramid-shaped Cu crystals include Cu crystals having a tetragonal pyramid shape.

* * * * *